US008186095B2

(12) United States Patent
Wilcox et al.

(10) Patent No.: US 8,186,095 B2
(45) Date of Patent: *May 29, 2012

(54) ADJUSTABLE FISHING OUTRIGGER APPARATUS

(75) Inventors: Scott A. Wilcox, Plantation, FL (US); Laudelino Baez, Miami, FL (US)

(73) Assignee: Tigress Specialty Metals Products Manufacturing, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/716,223

(22) Filed: Mar. 2, 2010
(Under 37 CFR 1.47)

(65) Prior Publication Data
US 2011/0083355 A1 Apr. 14, 2011

Related U.S. Application Data

(63) Continuation-in-part of application No. 11/600,320, filed on Nov. 16, 2006, now Pat. No. 7,669,361.

(60) Provisional application No. 60/736,857, filed on Nov. 16, 2005.

(51) Int. Cl.
*A01K 97/10* (2006.01)
(52) U.S. Cl. .......... 43/27.4; 43/21.2; 114/255; 248/515; 248/514
(58) Field of Classification Search ............... 43/21.2, 43/43.13, 27.4; 114/255; 248/514, 515
See application file for complete search history.

(56) References Cited

U.S. PATENT DOCUMENTS

| | | | | |
|---|---|---|---|---|
| 952,812 A * | 3/1910 | Jorgensen | ............ | 43/21.2 |
| 2,233,222 A * | 2/1941 | Paton | ............ | 52/110 |
| 2,360,402 A * | 10/1944 | Determan | ............ | 43/21.2 |
| 2,506,824 A * | 5/1950 | Brown et al. | ............ | 248/515 |
| 2,540,584 A * | 2/1951 | Jaycox | ............ | 248/515 |
| 2,580,130 A * | 12/1951 | Rowdon | ............ | 43/21.2 |
| 2,727,707 A * | 12/1955 | Wells | ............ | 43/21.2 |
| 2,884,213 A * | 4/1959 | Hiering | ............ | 248/515 |
| 2,886,268 A * | 5/1959 | Ahrens, Jr | ............ | 248/515 |
| 2,927,754 A * | 3/1960 | Davis | ............ | 248/514 |
| 2,958,491 A * | 11/1960 | Ackley | ............ | 248/514 |
| 3,008,259 A * | 11/1961 | Zornes | ............ | 248/515 |
| 3,014,679 A * | 12/1961 | Jepson | ............ | 43/15 |
| 3,060,614 A | 10/1962 | Prince | | |
| 3,063,668 A * | 11/1962 | Yohe | ............ | 43/21.2 |
| 3,161,390 A * | 12/1964 | Larson | ............ | 43/21.2 |
| 3,190,594 A * | 6/1965 | Chion | ............ | 43/21.2 |

(Continued)

FOREIGN PATENT DOCUMENTS

GB      2 181 932 A      5/1987

(Continued)

OTHER PUBLICATIONS

"Walker Tournament Electric Downrigger" — Basspro.com at http://cgi.ebay.com/ws/eBayISAPI.dll?ViewItem&item=7168037851&category=36151. Two pages printed from the Internet on Jul. 28, 2005.

(Continued)

*Primary Examiner* — Darren W Ark
(74) *Attorney, Agent, or Firm* — GrayRobinson, P.A.

(57) ABSTRACT

An adjustable outrigger for use on a marine vessel for supporting and selectively positioning a fishing outrigger pole includes a rotatable driving device which is coupled to a ball screw mechanism a rotatable member of which is coupled to a piston and to a track pitched in a direction along an axis to concurrently rotate the outrigger pole about the axis and angulate the outrigger pole in a plane perpendicular to that axis.

12 Claims, 13 Drawing Sheets

U.S. PATENT DOCUMENTS

| | | | |
|---|---|---|---|
| 3,212,740 A * | 10/1965 | Greenberg | 248/514 |
| 3,304,035 A | 2/1967 | Davis | |
| 3,304,036 A | 2/1967 | Davis | |
| 3,516,190 A * | 6/1970 | Cook | 43/21.2 |
| 3,570,793 A | 3/1971 | Shackel | |
| 3,708,141 A | 1/1973 | Friedgen et al. | |
| 3,724,791 A * | 4/1973 | Mason | 248/515 |
| 3,961,437 A | 6/1976 | Lewis | |
| 4,017,998 A | 4/1977 | Dumler | |
| 4,063,704 A | 12/1977 | Rother | |
| 4,142,315 A | 3/1979 | Hoffman | |
| 4,156,320 A * | 5/1979 | Kammeraad | 43/27.4 |
| 4,279,553 A | 7/1981 | Cleary | |
| 4,528,768 A | 7/1985 | Anderson | |
| 4,807,386 A * | 2/1989 | Emory, Jr. | 43/27.4 |
| 4,813,171 A * | 3/1989 | Cooper et al. | 43/27.4 |
| 4,869,195 A | 9/1989 | Eichfeld | |
| 4,875,428 A * | 10/1989 | Schlesch et al. | 43/21.2 |
| 4,901,469 A | 2/1990 | Murray | |
| 4,948,083 A * | 8/1990 | McNaney et al. | 43/21.2 |
| 4,993,346 A * | 2/1991 | Rupp | 43/21.2 |
| 5,054,737 A * | 10/1991 | DeLancey | 43/21.2 |
| 5,140,928 A * | 8/1992 | Frick | 43/27.4 |
| 5,243,927 A * | 9/1993 | Messick | 43/27.4 |
| 5,245,780 A * | 9/1993 | Hansen et al. | 43/27.4 |
| 5,247,759 A | 9/1993 | Noriega | |
| 5,438,789 A * | 8/1995 | Emory | 43/21.2 |
| 5,445,102 A * | 8/1995 | Rupp | 43/27.4 |
| 5,592,893 A * | 1/1997 | Jordan et al. | 114/364 |
| 5,685,107 A | 11/1997 | Sweet | |
| 5,738,035 A * | 4/1998 | Rupp, II | 43/21.2 |
| 5,761,844 A * | 6/1998 | Horschel | 43/21.2 |
| 5,855,088 A | 1/1999 | Lee | |
| 5,921,014 A * | 7/1999 | Lee | 43/21.2 |
| 5,921,196 A * | 7/1999 | Slatter | 43/27.4 |
| 6,045,109 A * | 4/2000 | Mashburn et al. | 43/21.2 |
| 6,052,937 A * | 4/2000 | Morong | 43/21.2 |
| 6,053,122 A * | 4/2000 | Jordan, III | 43/21.2 |
| 6,237,821 B1 | 5/2001 | Owen | |
| 6,269,584 B1 | 8/2001 | Peaschek | |
| 6,311,705 B1 * | 11/2001 | Ma | 248/514 |
| 6,408,779 B1 * | 6/2002 | Roy | 114/255 |
| 6,446,650 B1 * | 9/2002 | Ma | 248/514 |
| 6,505,431 B1 * | 1/2003 | Christian et al. | 43/21.2 |
| 6,533,237 B1 | 3/2003 | Matusek | |
| 6,568,643 B2 | 5/2003 | Black | |
| 6,575,182 B2 * | 6/2003 | Tung | 248/514 |
| 6,622,741 B2 * | 9/2003 | Lai | 248/514 |
| 6,637,146 B2 * | 10/2003 | Ernst | 43/21.2 |
| 6,668,745 B2 * | 12/2003 | Slatter | 114/255 |
| 6,678,990 B2 * | 1/2004 | Cox | 114/255 |
| 6,684,558 B1 * | 2/2004 | Gillespie | 43/27.4 |
| 6,729,065 B2 * | 5/2004 | Cooper | 43/27.4 |
| 6,766,757 B1 * | 7/2004 | Tilley | 43/21.2 |
| 6,769,377 B2 * | 8/2004 | Rupp, II | 43/21.2 |
| 6,941,694 B2 * | 9/2005 | Ernst | 43/21.2 |
| 6,978,570 B1 * | 12/2005 | Clark et al. | 43/27.4 |
| 7,007,906 B2 * | 3/2006 | Slatter | 43/21.2 |
| 7,114,283 B2 * | 10/2006 | Slatter et al. | 43/27.4 |
| 7,197,845 B2 * | 4/2007 | Wilcox et al. | 43/21.2 |
| 7,296,377 B2 * | 11/2007 | Wilcox et al. | 43/21.2 |
| 7,509,769 B2 * | 3/2009 | Wilcox et al. | 43/21.2 |
| 7,669,361 B2 * | 3/2010 | Baez | 43/27.4 |
| 2003/0005616 A1 | 1/2003 | Slatter | |
| 2003/0167674 A1 | 9/2003 | Cooper | |
| 2004/0181992 A1 | 9/2004 | van Weenen | |
| 2004/0244268 A1 | 12/2004 | Slatter et al. | |
| 2007/0119089 A1 * | 5/2007 | Nicholson | 43/27.4 |
| 2007/0157863 A1 | 7/2007 | Wilcox et al. | |
| 2007/0214706 A1 * | 9/2007 | Donato | 43/21.2 |
| 2008/0053361 A1 * | 3/2008 | Nicholson | 248/514 |
| 2008/0134565 A1 * | 6/2008 | Sutherland et al. | 43/21.2 |
| 2008/0155881 A1 * | 7/2008 | Carnevali | 43/21.2 |

FOREIGN PATENT DOCUMENTS

| | | |
|---|---|---|
| JP | 5292860 A | 11/1993 |
| JP | 7067502 A | 3/1995 |
| JP | 9168358 A | 6/1997 |
| JP | 2002176895 A | 6/2002 |
| JP | 2003125688 A | 5/2003 |
| WO | 98/53675 A1 | 12/1998 |

OTHER PUBLICATIONS

"Tigress Adjustable Outrigger Holder—Clamp-On" Basspro.com at http://www.basspro.com/servlet/catalog.Textld? hvarTarget=search& hvarTextld=58839&hvarAID=froogle&cm_ven=Perfomics& cm_cat-Searc . . . Two pages printed from the Internet on Jul. 28, 2005.

"Taco Grand Slam Adjustable Top Mounts", Star Marine Depot. Two pages printed from the Internet. Copyright 2004 Star Marine Depot, Inc.

"Taco Grand Slam Fixed Top Mount", Star Marine Depot. Two pages printed from the Internet. Copyright 2004 Star Marine Depot, Inc.

* cited by examiner

ADJUSTABLE FISHING OUTRIGGER APPARATUS

CROSS-REFERENCE TO RELATED APPLICATIONS

This application is a continuation-in-part of, and claims priority under 35 U.S.C. §120 to, co-pending U.S. patent application Ser. No. 11/600,320 filed Nov. 16, 2006 which in turn claims the benefit of U.S. Provisional Application Ser. No. 60/736,857 filed Nov. 16, 2005 under 35 U.S.C. §119(e) for all commonly disclosed subject matter. U.S. Provisional Application Ser. No. 60/736,857 and U.S. application Ser. No. 11/600,320 are each expressly incorporated herein by reference in their entirety to form a part of the present disclosure.

FIELD OF THE INVENTION

The invention relates to the field of fishing. More particularly, the invention relates to an adjustable fishing outrigger apparatus which supports and positions an outrigger pole of the type used for extending trolling lines outboard of a marine vessel. The apparatus includes a rotatably driven mechanism which positions the outrigger pole as desired at substantially any selected position over a substantially infinitely adjustable range of positions along a path by effecting concurrent and mutually coordinated rotation of the outrigger pole about a defined axis and angulation of the outrigger pole with respect to a plane to which the defined axis is perpendicular. In a preferred form, a latch can be coupled between the rotatably driven mechanism and a rotatable driving device with at least one of a pair of mutually supported engageable latch members being supported by way of a slip coupling. The slip coupling allows the latch to be forcibly biased in favor of engagement of the mutually engageable latch members. Preferably the slip coupling is oriented such that at least a portion of the overall magnitude of the biasing force is generated by gravity due the weight normally acting on the slip coupling when the outrigger apparatus is not being deliberately rotatably driven, thus causing the apparatus to resist undesired or unexpected changes in the position of the outrigger pole without need of a user taking any deliberate action to engage the latch.

BACKGROUND OF THE INVENTION

Trolling is a popular and effective fishing technique which generally involves marine a vessel to pull a fishing bait, such as a baited hook or a lure, through the water at the end of a fishing line to attract and catch fish. Typically, the fishing line is a length of line which has been paid out from a fishing reel mounted on a fishing rod. Forward motion of the vessel drags the trolled bait though the water causing the bait to simulate the movement of a relatively slow swimming prey, thereby making the bait attractive to fish. After a fish strikes the bait and becomes hooked, the rod and reel are used to reel in the line to point where the fish can be brought aboard the vessel.

Anglers can increase the probability of success by trolling multiple lines from a boat simultaneously. When trolling with multiple fishing lines, it is desirable to keep the lines spatially separated from one another to cover a larger potential fishing area and to prevent the lines from becoming entangled with one another or with the rigging, superstructure, engine and/or propeller of the vessel itself. However, since the width, or "beam" of any given vessel is limited, so too is the number of fishing lines which can be trailed from the vessel without undue risk of becoming entangled. Although a fishing rod can be positioned so that the tip of the rod reaches out over the water to the port or starboard of the vessel, the benefit of doing so is limited by the length of the fishing rod. Since they are subjected to significant forces due to the hydraulic drag associated with trolling a bait, not to mention the forces generated when attempting to bring in a large and powerful fish, trolling rods tend to stout but relatively short, especially the type of rods used for trolling for saltwater game fish.

Outrigger poles are devices which can be mounted to a vessel and used in conjunction with a fishing rod and reel to increase the spatial separation between trolling lines and/or to increase the number of fishing lines which can be trolled with sufficient separation. An outrigger pole is an elongated structure of significantly greater overall length than a typical fishing rod. When in use, one end of the outrigger pole is secured on or adjacent the vessel while its distal end is positioned over the water a substantially greater distance away from the vessel than could be reached from the vessel with the tip of the fishing rod by itself. Outrigger poles of between ten and thirty feet in overall length are common. Outrigger poles are sometimes provided with a supporting cable structure so they can be long yet relatively light in weight without breaking under the stresses they are routinely subjected to due to their own weight as well due to the motion of the vessel, waves and wind. Since they are supported from only one end when in use, outrigger poles are generally designed to be at least somewhat flexible, allowing them to bend somewhat under load rather than cracking or buckling as would be the tendency of a rigid structure. The fishing line paid out from the tip of the fishing rod is releasably suspended from the outrigger pole so that the trailing length of the fishing line which terminates in the bait, is pulled through the water from a point that is located above the surface of the water and is laterally spaced further from the longitudinal centerline of the vessel a further distance beyond the port or starboard side of the vessel than could ordinarily be reached using the fishing rod alone. When trolling a fishing line with the aid of an outrigger pole, it is desirable to maintain the outrigger pole at an elevated angle so that the tip of the extended, pole does not dip into the water, even if the vessel would happen to roll somewhat under the influence of wind and/or waves.

Aluminum, which is preferably anodized, powder coated, or otherwise finished to resist corrosion, is a common material of which at least the longitudinal main body of outrigger poles can be made. However, they can also be constructed from graphite, carbon fiber, aramid fiber, such as for example the para-aramid fiber commercially available from E. I. du Pont de Nemours and Company of Wilmington, Del. under their registered trademark Kevlar® and other synthetic and/or composite materials. Also, although it is common to make the longitudinal body of outrigger poles in a single, one-piece section, multiple longitudinal sections, that can be connected to one another, either detachably, or substantially permanently, are often used to form the longer units. Multi-section, telescoping outrigger poles are also known. These include two or more individual unitary longitudinal body sections, at least one of which is hollow and of sufficient internal diameter to allow at least most of the length of one or more of the other sections to be collapsibly received inside for convenient transit or storage but can be telescopingly extended to a significantly greater overall length for use are also known.

To use an outrigger, the free end of a fishing line paid out from a reel mounted on a fishing rod is attached to a lure, or otherwise suitably baited with a live or artificial bait appropriate to the targeted species of fish. The bait is cast or dropped into the water from the moving vessel and fishing line is paid out until a desired length of line, typically anywhere from about fifteen yards to several hundred yards, lies between the bait and the moving vessel, at which point the reel engaged and the drag setting of the reel is adjusted to a force that is at least high enough to allow the vessel to tow the bait without paying out more line unless a fish were to later strike and create enough total tension on the line to overcome the drag setting of the reel. The fishing line at a point a relatively short distance from the tip of the fishing rod is then detachably secured to an outrigger pole in a deployed position by way of a releasable clip. The clip is securely attached to the outrigger pole by way of a loop of line which is routed along the length of the outrigger pole by way of one or more pulleys and/or eyelets, in a manner similar to the line used to run a flag up and down on a flagpole. Pulling the loop for one side or the other allows the releasable clip to be run in to an inboard or nearly inboard location to allow the fishing line to be attached to the releasable clip without requiring an angler or crew member to lean precariously out over the water in order to make that connection and thereafter run out along the outrigger pole to the distal end, or any other location along the length of the outrigger pole which might be desired for trolling the baited fishing line. Some outrigger poles have provisions for trolling multiple fishing lines simultaneously from different locations on the same outrigger. Once a fish strikes, the resulting additional tension on the fishing line pulls the fishing line free of the releasable clip, and thus completely free of the outrigger pole, allowing the angler to attempt to reel in the fish conventionally using the rod and reel in the conventional way.

An outrigger pole must be mounted securely. When in a deployed position, orienting the longitudinal axis of the outrigger pole at an angle near ninety degrees (90°), to the longitudinal centerline of the vessel will provide the maximum separation distance between the vessel and a trolled line but any position at which the distal end of the outrigger pole is sufficiently above the water and clear of the vessel that it can be used for trolling in a practical manner may serve as a deployed position. It is common to equip a vessel with more than one outrigger. For example, providing a vessel with a pair of outrigger poles, one deployable to extend outboard of the port side of a marine vessel, another deployable to extend outboard from its starboard side, is a popular configuration which provides trolling coverage over a swath of fishing area that is substantially wider than the vessel itself and extends on one or both sides of the vessel. It will be appreciated that one very significant benefit of using outriggers is energy efficiency. Since trolling is carried out while a vessel is being driven under power and consuming fuel, equipping the vessel with an outrigger or outriggers allows larger area to be fished per mile of travel of the vessel and thus, per unit of fuel consumed by the vessel. Concomitantly, the emission of pollutants and greenhouse gasses by the vessel is also reduced.

Particularly when a vessel is near a dock, in a harbor or anywhere other than relatively open water, an outrigger pole in a deployed position can present difficulties and hazards, even if a vessel is stationary but particularly while a vessel is underway. The elevation of the pole reduces the overall clearance to overhead obstacles, such as bridges. A deployed outrigger pole also requires a wide clearance to the side of the boat. When navigating in narrow channels or near dockside, or in the vicinity of other vessels, sufficient clearance may not be available. Accordingly, it is important to have the capability of bringing the outrigger pole to a "rigged-in", or stowed position, preferably one in which little, if any, of the outrigger projects a significant distance out over the water away from the vessel and in which the highest point on the outrigger pole is at a sufficiently low elevation as not to restrict the ability of the vessel to pass safely beneath bridges, overhanging trees, suspended electric cables or other overhead obstacles. Preferably though not necessarily, the stowed position is one in which the longitudinal axis of the outrigger pole will be oriented horizontally or at a relatively low elevational angle.

It is also desirable to be able to position, or reposition the outrigger pole quickly, safely and without undue effort. Only if an outrigger pole can be deployed rapidly from a stowed position will a crew be able to take fullest advantage of the sudden identification of fish in an area. Conversely, the ability to rig in an outrigger from a deployed position to a stowed position quickly is important for example in the so-called "run and gun" technique popular in tournament fishing where success hinges on the ability to try a fishing spot but abandon it and move on as fast as possible to a different fishing ground if the present one is determined to be unproductive. Rigging in quickly is important also to allow anglers on open water to reduce the risk of lightning strikes and flee approaching storms with a minimum of delay. Scenarios such as rounding a bend and suddenly finding one's vessel rapidly closing on a low bridge, oncoming vessel or other obstacle may require rigging in an outrigger quickly to avoid an accident. It is also desirable that re-positioning an outrigger pole from one deployed position to another should not require undue time, effort or safety risk.

For safety and ease of use, it is also desirable that the positioning of the outrigger pole can be performed by a person from a safe and convenient location. For example, it is preferable that stowing, deploying or repositioning not require leaning over the side of the vessel as doing so might expose personnel to a risk of falling overboard.

Despite being relatively light in weight, the mass of an outrigger pole is not insignificant and loss of control over the outrigger pole could give rise to substantial safety hazards. Particularly when a vessel is underway or even static under rough weather condition, an outrigger pole may experience a number of significant external forces. The movement of the vessel and/or any prevailing wind act to exert a wind drag force on the outrigger pole when the outrigger pole is in the fully deployed position. The fishing line and bait also exerts a force on the outrigger pole due to hydraulic drag resulting from the vessel trolling them through the water. It is desirable that an outrigger apparatus firmly maintain the position of the outrigger pole, regardless of whether the outrigger pole is in a stowed position, or a deployed position so that the outrigger pole does not swing about, drop or otherwise change position unexpectedly, thus and become damaged and/or cause injury to persons and/or damage to the vessel an/or other property. For similar reasons, the position of the outrigger pole should be maintained under positive control while the outrigger pole is in the process of being repositioned.

SUMMARY OF THE INVENTION

The invention relates to an adjustable fishing outrigger apparatus for selectively positioning the outrigger pole outboard of a fishing vessel to deploy the pole from a stowed position to a deployed position and/or to re-position the pole between different deployed positions for fishing and/or for rigging the outrigger pole in to a stowed position when not fishing. Although subject to some variation based on the configuration of a particular vessel and the preferences of its captain, the stowed position is typically at least somewhat elevationally-lowered relative to a deployed position, so that the outrigger pole can clear bridges or other overhead obstacles beneath which the vessel pass, and is rotated in at least somewhat inboard so the vessel can pass by other vessels, dockside structures or the like without danger of the outrigger pole striking them.

Preferred embodiments of an outrigger apparatus according to the invention typically include a housing that can be mounted to the vessel itself, such as to the roof of a pilot house or cabin, or to the transom, or sides of the vessel or elsewhere. Alternatively, the apparatus can be mounted to a vessel by way of or to a secondary structure, such as a fishing T-top, that is itself secured to the vessel. It is to be understood that the outrigger pole may either form an integral part of the outrigger apparatus itself, or may be detachably coupled to the apparatus. In the latter case, the apparatus may, by way of non-limiting example, be equipped with a receiver which receives and supports an outrigger pole in a readily removable manner. Such receiver may suitably take the form of one having a tubular socket which is internally sized and shaped to accept and hold a lower end portion of an outrigger pole. The apparatus includes a rotatably drivable mechanism which allows the outrigger pole to be selectively positioned substantially infinitely variably, at virtually any position within a range which extends from a stowed position to an extreme deployed position or, vice versa and including a plurality of virtually infinitely selectable intermediate positions between the stowed position and the extreme deployed position.

An outrigger apparatus according to the present invention may take the form of either electrically powered embodiments, which are rotatably driven by an electric motor, or manually powered embodiments, which are rotatably driven by a hand operated crank coupled to the rotatable drive mechanism. In either case, driving the rotatable drive mechanism in a first rotatable direction causes the outrigger pole to concurrently (i) rotate in a first rotatable direction about a defined axis which is normal to a plane and (ii) angularly incline relative said plane, thereby elevating the distal end of the outrigger pole and rotating it away from the stowed position. Conversely, driving the rotatable drive mechanism in reverse causes the outrigger pole to concurrently (i) rotate in a second direction about the aforementioned axis and (ii) angularly decline relative the aforementioned plane, thereby lowering the distal end of the outrigger pole and rotating it toward the stowed position. Thus, the outrigger pole may be selectively repositioned from the stowed position to the fully deployed position, or an intermediate position, by rotating the motor or hand operated crank in one rotational direction. Conversely, the outrigger pole may be selectively repositioned from the fully deployed position to the stowed position, or an intermediate position, by rotating the motor or hand operated crank in one rotational direction. For example, in one preferred embodiment, the outrigger pole is rotated inboard and is inclined about four degrees (4°) above nominal horizontal when in a stowed position, whereas the outrigger pole is elevated to about thirty-two degrees) (32°) or more above nominal horizontal, but preferably not more than about forty-five degrees (45°) above horizontal, when fully deployed.

In manually driven embodiments, a hand crank may be coupled, either directly, or by way of intermediate gearing, to a drive shaft of the rotatable drive mechanism. In electrically driven embodiments, intermediate gearing may or may not be interposed between the drive shaft and the output shaft or rotor of the motor. In either case, a ball screw mechanism coupled to the drive shaft converts the reversible rotation of the shaft into reversible linear motion. By ceasing rotation of the drive shaft, the ball nut can be stopped at any position along its linear travel along the length of the ball screw. The ball nut is attached to a piston that constrains the rotation of the ball nut so that the ball nut moves vertically on the ball screw as the ball screw rotates on a vertical axis. The linear motion of the ball nut moves the piston linearly up or down, depending on the direction of rotation of the operating handle.

A coupler, which is preferably disposed in substantially coaxial relation to the piston, includes at least one spiral or helical track which is pitched in the axial direction. The track forces the piston to rotate about the axis as the piston moves axially. The piston is coupled to the track such that as the piston is driven linearly either up or down along the vertical axis by the ball screw assembly, the track forces the piston to rotate in one direction or the other about the vertical axis. The piston is forced to rotate in a first rotational direction about the vertical axis in response to being driven by the ball screw assembly in one axial direction. Conversely, as the ball screw assembly drives the piston linearly in the opposite axial direction, the track forces the piston to rotate in a second rotational direction which is rotationally opposite the first rotational direction. The tracks or multiple tracks can be formed as slots cut into the cylindrical wall of the coupler. Guide pins attached to the bottom of the piston slide along a track of the coupler and serve to couple the piston to the track.

A linkage is pivotally attached to the top of the piston. If desired, the outrigger pole may be attached permanently to the linkage. More preferably, however, the outrigger apparatus preferably includes intermediate structure adapted to allow an outrigger pole to be selectively either securely attached to the linkage or detached completely therefrom in a quick and simple way. Such intermediate structure may suitably take the form of a tubular receiver attached to the top of the linkage for removably receiving the base of an outrigger pole. The linkage is pivotally mounted and the piston is coupled to the linkage in such a way that as the piston moves upward along the vertical axis, the angle of inclination of the linkage, and of the receiver, increases thereby increasing the elevation angle of the outrigger pole. Simultaneously with the change of inclination, as the piston rotates, the trolling pole receiver is rotated in a horizontal plane towards the outboard position. When the piston moves axially downward, the elevation angle of the outrigger pole is reduced. Preferably, in a stowed position the outrigger pole is positioned at an elevation angle inclined slightly above horizontal and is oriented rotationally with respect to the nominally vertical axis such that the distal end of the outrigger pole is completely inboard or projects as short a distance as possible beyond the port or starboard sides of the vessel as measured in a direction perpendicular to the longitudinal centerline of the vessel.

According to a further aspect of the invention which has been incorporated in simplified and improved second and third preferred embodiments disclosed herein, the use of a gear train of any kind for driving the positioning of a fishing outrigger pole can be completely avoided. In such embodiments, a rotatable driving device, such as a manual crank, or an electric motor, is coupled, either directly or by way of a latch, to the ball screw without interposing any form of gear train between the ball screw and the rotatable driving device and the output shaft of rotatable driving device is disposed substantially axially aligned with the nominally vertical axis about which the outrigger pole is rotated in order to be positioned. In such embodiments the output shaft of the hand crank, electric motor, or other rotatable driving device delivers torque to the ball screw in the same rotational direction in which it drives the ball screw and rotates the ball screw at the same instantaneous rotational speed as that of the output shaft of the rotatable driving device.

The apparatus also preferably includes a latch assembly which serves to resist undesired or unexpected changes in position due to wind, motion of the vessel or other external influences. In a preferred form, the latch assembly includes a pair of mutually engageable latch members, one of which is coupled to a rotating component of the rotatably drivable mechanism. The latch members selectively engage one another to resist mutual rotation, thus locking the drivable mechanism. According to yet a further aspect of the present invention as embodied in the second and third preferred embodiments disclosed herein, a latch is operably disposed between the output shaft of the rotatable driving device and the ball screw assembly.

In a preferred form, the latch is one which includes first and second mutually engageable latch members of mutually complementary shape, one of which is rotationally fixed, the other of which is coupled to a rotating element of the ball screw assembly for rotation therewith. The latch includes a slip coupling which is driveably interposed between the ball screw assembly and which is biased to cause the mutually engageable latch members to engage one another, thereby resisting rotation of the rotating element of the ball screw assembly, and thus also resisting change in the position of the outrigger pole, unless a biasing force is deliberately overcome by a force in a direction effective to actuate the slip coupling in a direction which disengages the mateable latch members. The slip coupling allows the latch to be forcibly biased in favor of engagement of the mutually engageable latch members. Preferably, the slip coupling is oriented such that at least a portion of the overall magnitude of the biasing force is generated by gravity due the weight normally acting on the slip coupling when the outrigger apparatus is not being deliberately rotatably driven, thus causing the apparatus to resist undesired or unexpected changes in the position of the outrigger pole without need of a user taking any deliberate action to engage the latch.

Preferably the bias force is a force that is present at sufficient magnitude under normal operating conditions due to gravity alone thus providing fail safe operation. Optionally, in lieu of generating the entire magnitude of the biasing force by the action of gravity alone, a spring may be provided to generate at least a portion of the overall magnitude of the biasing force, regardless of whether or not a portion thereof is generated by gravity.

These and other objects and advantages of the present invention will become readily apparent to a person of ordinary skill in the art upon review of the following detailed description of preferred embodiments thereof together with review of the appended drawings wherein like reference numerals are used to denote like items and wherein:

DETAILED DESCRIPTION OF THE PREFERRED EMBODIMENTS

Figure 1A:
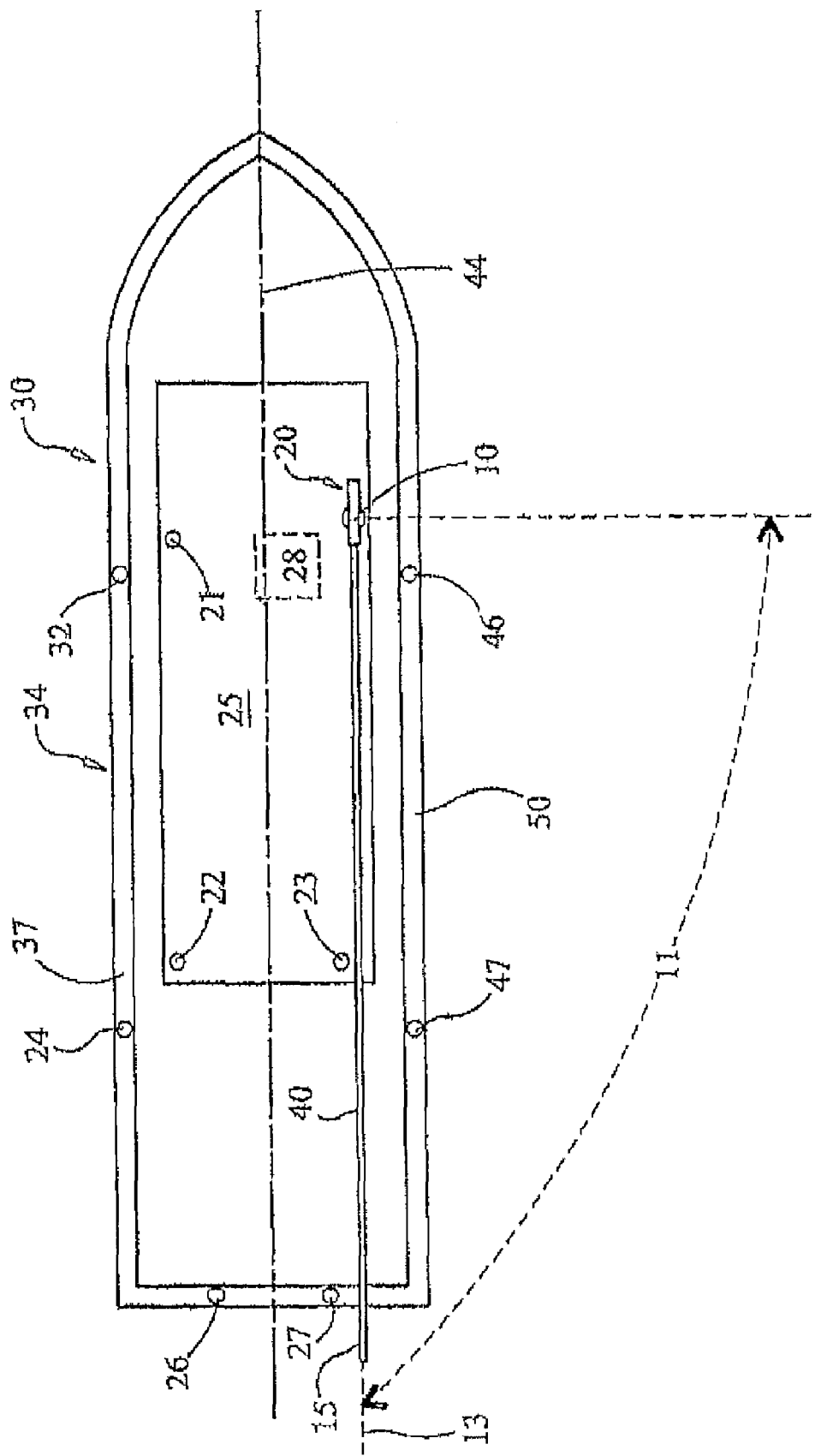
FIG. 1A is a plan view showing a first preferred embodiment of an adjustable outrigger apparatus mounted to a marine vessel, the outrigger apparatus being shown positioned in an example of a stowed position.

FIG. 1A is a schematic representation of a marine vessel 30 to which is mounted a first preferred embodiment of an adjustable outrigger apparatus 20. By way of non-limiting example, apparatus 20 is shown mounted to an overhead structure 25 beneath which is located the helm station 28 of the marine vessel 30. Overhead structure 25 could suitably be for example the roof of an enclosed or partially enclosed cabin or the roof of a marine t-top or an element of a marine tower, or half-tower structure. It is to be understood however that apparatus 20 could suitably be mounted elsewhere on vessel 30 such as closer to its port side 34 including without limitation locations such as location 21 or location 22 on overhead structure 25; location 24 or location 32, on the port side rail 37, or at location 26 atop the transom 36 of vessel 30. Alternatively, or in addition to, one or more of the foregoing locations, apparatus 20 could also suitably be mounted at various locations to the starboard of the longitudinal centerline 44 of vessel 30. Such locations include, by way of non-limiting example, location 23 near the aft end of overhead structure 25; locations 46 and 47 on the starboard side rail 37 of vessel 30, and location 27 atop transom 36.

An outrigger pole 40 may either form an integral part of outrigger apparatus 20 or, apparatus 20 may be adapted to have an outrigger pole 40 detachably mounted thereto, in such manner as described in further detail below. In either case, the outrigger pole 40 has a longitudinal central axis 13 the orientation of which can be substantially infinitely variably adjusted relative to vessel 30 using apparatus 20 to selectively position outrigger pole 40 at virtually any desired position along a predetermined path of travel and/or to reposition outrigger pole 40 from virtually any arbitrary position along that path to another. Outrigger apparatus 20 reversibly adjusts the position of the outrigger pole 40 along the path in response to being rotatably driven by a rotatable driving device 9 which may suitably comprise either a manual hand crank 18 or, in alternative embodiments, an electric motor. Under motive power delivered by the rotatable driving device 9, the longitudinal centerline 13 of the outrigger pole 40 can be adjusted concurrently and in a mutually coordinated manner into two degrees (2°) of freedom, namely, with respect to rotation about a defined axis 10 and with respect to the angulation of the longitudinal centerline 13 of the outrigger pole 40 relative to a plane which lies perpendicular to axis 10.

Figure 1B:
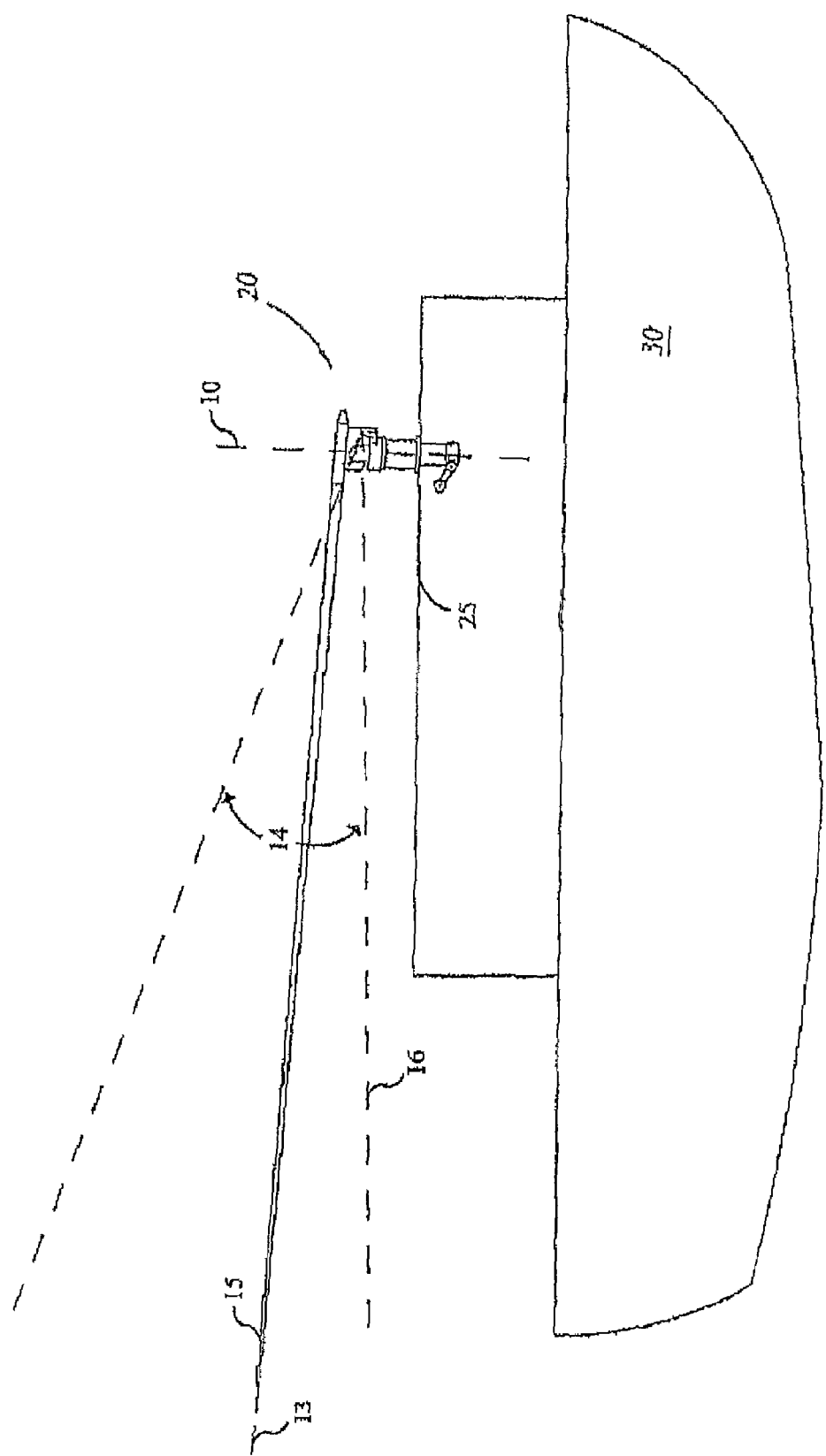
FIG. 1B is a starboard side elevational view showing the marine vessel of FIG. 1A with the first preferred embodiment of FIG. 1A mounted to the marine vessel, the outrigger apparatus being shown positioned in the same example of a stowed position as shown in FIG. 1A.
Figure 1C:
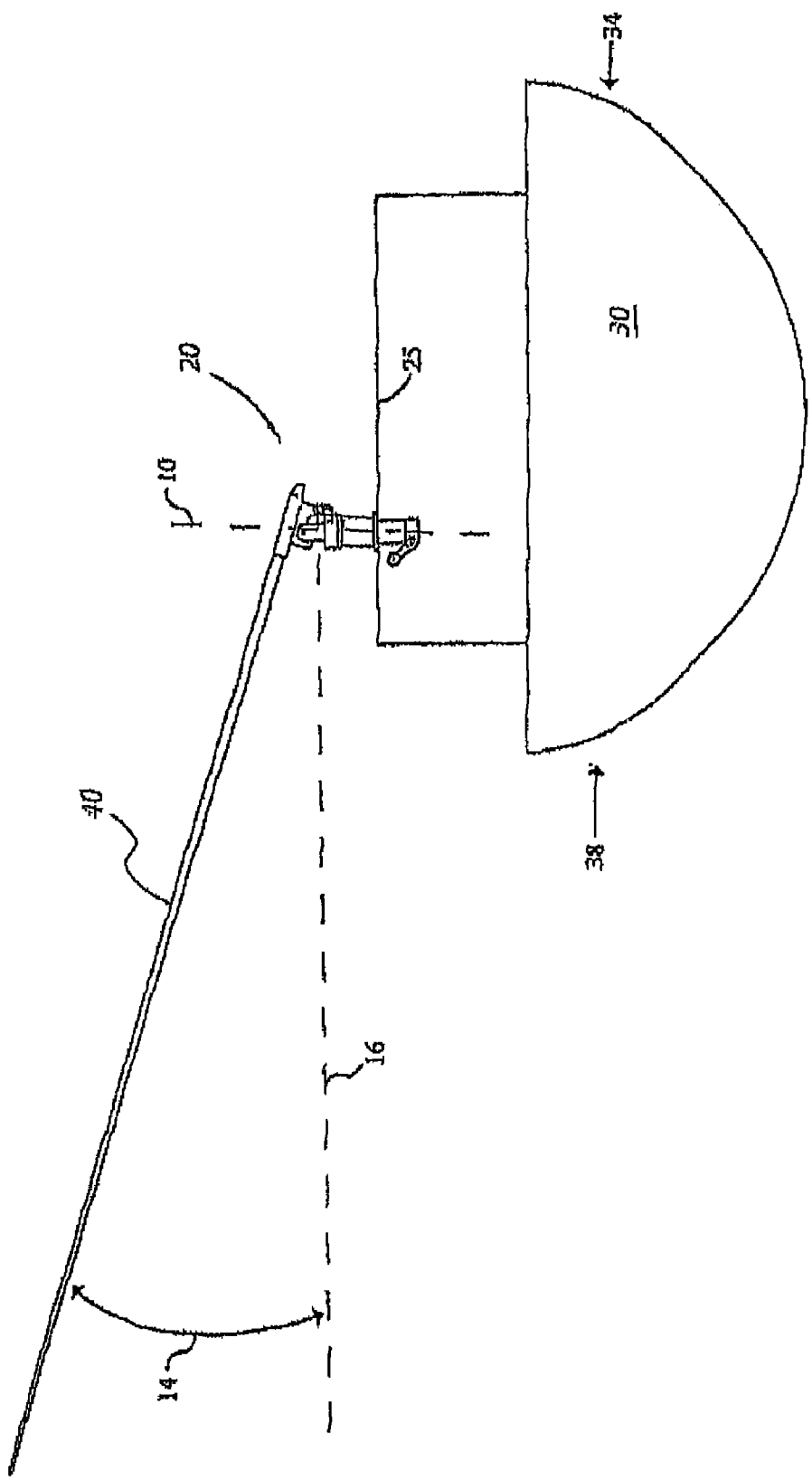
FIG. 1C is a front elevational view showing the marine vessel of FIG. 1A with the outrigger apparatus of FIG. 1A mounted to the marine vessel as in FIG. 1A, the outrigger apparatus being shown positioned in an example of a deployed position.

As indicated in FIGS. 1A, 1B and 1C, the combined motion which results from rotatably driving apparatus 20 concurrently alters both an angle of rotation 11 of outrigger pole 40 about an axis 10 and an angle 14 of the outrigger pole 40 relative to a plane 16 which is perpendicular to axis 10. Preferably, apparatus 20 will typically be constructed, and mounted on a vessel 30, such that when vessel 30 is afloat on an even keel, axis 10 will be oriented at least approximately vertically, and plane 16 will be at least approximately horizontal so that changes of angle 14 will adjust to height of the distal end 15 of outrigger pole 40 above the surface of the water. For convenience of reference, axis 10 may sometimes be referred to herein as a "vertical" axis and plane 16 as a "horizontal", or "nominally horizontal" plane and angle 14 as an "elevation angle". It is to be understood however that such references are not to be construed as requiring that apparatus 20 be constructed or mounted on a vessel such that axis 10 will be strictly vertical or that plane 16 will be strictly horizontal. Rather, such references are intended merely to suggest preferred orientations in a typical installation and to denote that axis 10 is perpendicular to plane 16.

The path of travel of outrigger pole 40 terminates at one extreme at a position in which will be referred to herein as a stowed position, and at an opposite extreme at a position which will be referred to herein as a fully deployed position. By driving the outrigger apparatus 20 rotatably, the outrigger pole 40 may be rotated into any desired position along the aforementioned path. FIGS. 1A and 1B show the outrigger apparatus 20 holding the outrigger pole 40. In a fully deployed position, the outrigger pole 40 is inclined at a relatively steep elevation angle 14, and the outrigger pole 40 is positioned outboard of the vessel 30. In FIG. 1A, the outrigger apparatus 20 holds the outrigger pole 40 in a stowed position inboard of the vessel 30. In the stowed position, the elevation angle 11 of the outrigger pole 40 is reduced to a more nearly horizontal position, providing a more compact arrangement of the outrigger pole 40 when not in use and allowing vessel 30 increased sideward clearance for navigation and docking. By rotatably driving the outrigger apparatus 20, the outrigger pole 40 may be moved from the deployed position to the stowed position by an operator disposed at a safe and convenient location aboard vessel 30.

Figure 2:
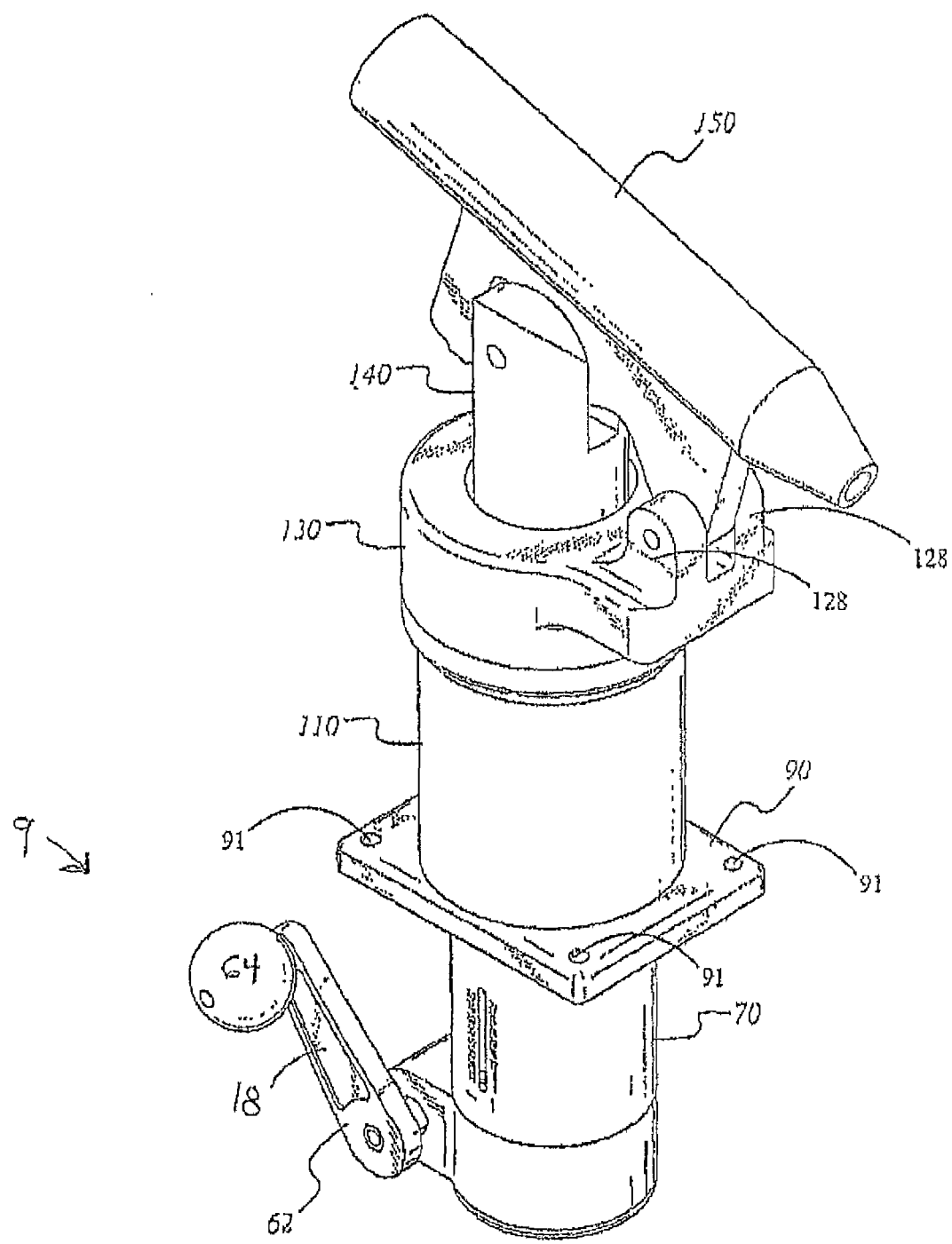
FIG. 2 is a front perspective view of a first preferred embodiment of an adjustable outrigger according to the present invention.

The structure and operation of a first preferred embodiment of an adjustable outrigger apparatus 20 may be understood in further detail by referring to FIG. 2. The adjustable outrigger apparatus 20 includes a rotatable driving device 9 for applying torque as required to effect the positioning of outrigger pole 40 described above.

In manually powered embodiments, rotatable driving device 9 may, as noted above, comprise a hand crank 18. Hand crank 18 includes an operating handle or crank arm 62 which, is connected to an output shaft 13 which in the first embodiment 20, is rotatable in a vertical plane. In the second preferred embodiment 20" and third preferred embodiment 20, hand crank 18, if used in lieu of an electric motor 19, has an output shaft 13 which preferably rotates about axis 10. A system of gears, described below, transmits the rotation of the rotatable driving device 9 into the actions required to deploy or stow an outrigger pole 40 held by the outrigger apparatus 20. The outrigger apparatus 20 further comprises an underbody 70, which contains drive gear components, a base plate 90 for mounting the outrigger apparatus 20 to a vessel 30, a body 110 that on the first preferred embodiment houses additional gearing components. The rotatable driving device 9 is coupled either with, or without interposed gearing to a ball screw assembly which operates a piston 140 that rotates about axis 10 to rotate the outrigger pole 40 either inboard or outboard of the fishing vessel 30 and concurrently translates linearly along axis 10 to change the elevation angle of the outrigger pole 40. The outrigger apparatus 20 has a cap assembly 130 concentric with the piston 140. A portion of the cap assembly 130 is rotatably coupled to the piston 140. A linkage pivotally attached to the rotatable portion of the cap assembly 130 and to the piston 140 supports a receiver 150. The outrigger pole 40 being deployed by the outrigger apparatus 20 is held removably in the receiver 150. As the piston 140 translates axially relative to outrigger body 110, the linkage pivots on the cap assembly 130 carrying piston 140 to either an increase or a decrease in the inclination of the receiver 150 and thus change the elevation angle 14 of the outrigger pole 14 held by the receiver 150.

Figure 3:
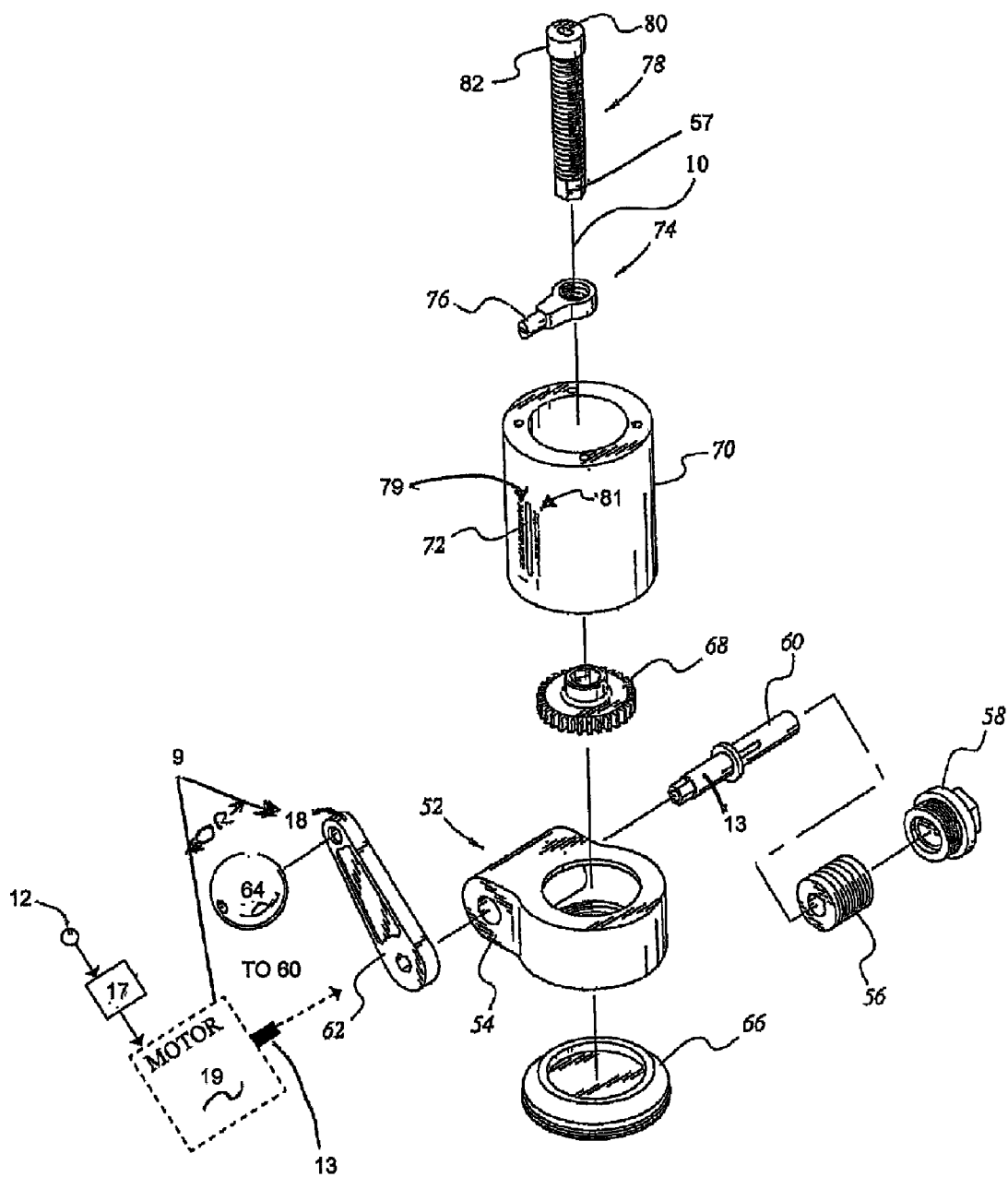
FIG. 3 is an exploded perspective view of a lower portion of the preferred embodiment of FIG. 2.

By referring to FIGS. 2 and 3, details of the lower portion of the outrigger apparatus 20 may be understood. A manual crank 18 includes a knob 64 which is freely rotatably attached to one end of a crank arm 62. The other end of crank arm 60 is rotatably drivably coupled to a cylindrical drive shaft 60 by way of an output shaft 13 through which manual crank 18 delivers motive power. The knob 64 attached to the free end of the crank arm 62 provides a purchase point for an operator turning the operating handle 62. The drive shaft 60 is rotatably journaled at one side of a cylindrically shaped gear housing 52. Concentrically fixed to the drive shaft 60 is a worm 56 which engages a worm gear 68. Rotating the handle 62 in a vertical plane rotates the worm 56 within the journal 54 of the gear housing 52. The gear housing 52 defines a vertical cylindrical cavity, which communicates with the journal 54 holding the drive shaft 60 and worm 56. As illustrated in FIG. 3, drive shaft 60 and worm 56 are retained in gear housing 52 by a threaded cap 58. A worm gear 68 is supported within the cavity formed by bottom cap 66 and the gear housing 52. The bottom cap 66 closes off the bottom of the gear housing cavity. The worm 56 drives the worm gear 68 so that the rotation of the handle 62 results in the gear 68 rotating within the gear housing 52 around the axis 10.

A cylindrical underbody 70 is attached to the top of the gear housing 52. The underbody 70 defines an internal vertical cylindrical cavity. A vertical threaded shaft 78 is located within the cavity of the underbody 70 centered on axis 10. The lower end of the vertical shaft 78 is provided with a hexagonal key, which fits rotatably driveably inside a mating hexagonal recess 58 formed in the central hub of gear 68. A generally ring-shaped position indicator 74 having a radially outwardly extending pin or indicator tab 76 is threaded onto the vertical shaft 78 for bidirectional linear travel lengthwise along at least a portion of the length of shaft 78. Tab 76 extends radially so that at least an end portion of tab 76 slidably engages slot 72 and is guided for linear travel by the walls of slot 72. When gear 68 causes the vertical shaft 78 to rotate in either one rotational direction or an opposite rotational direction, the position indicator 74 moves linearly in a corresponding direction, either up or down along shaft 78, thus moving the indicator tab 76 linearly either up or down within the slot 72. Located on respective opposite sides of slot 72 is a pair of scales, 79 and 81. The position of indicator tab 74 can readily be viewed through slot 72. If desired, slot 72 may optionally be fitted with a transparent window to prevent water and contaminants from infiltrating lower body 70. Indicator tab 76 registers against scales 79 and 81 having indicia disposed on opposite sides of the indicator slot 72 to indicate the present position of the outrigger pole 40 according to the registration of tab 76 with the indicia. Preferably the indicia comprise a series of numerical values representing angles 11 and 14 in units of degrees. Alternatively, other indicia such as ones indicating the position of outrigger pole 40 as a fraction or percentage of its total allowable travel could also be used. As can be seen from both FIG. 3 and FIG. 4, the upper end the vertical shaft 78 is provided with a disk shaped head 82 having a generally rectangular slot 80 formed therein. Alternatively, slot 80 may be integrally formed in ball screw 106 such as by electrical discharge machining.

Figure 4:
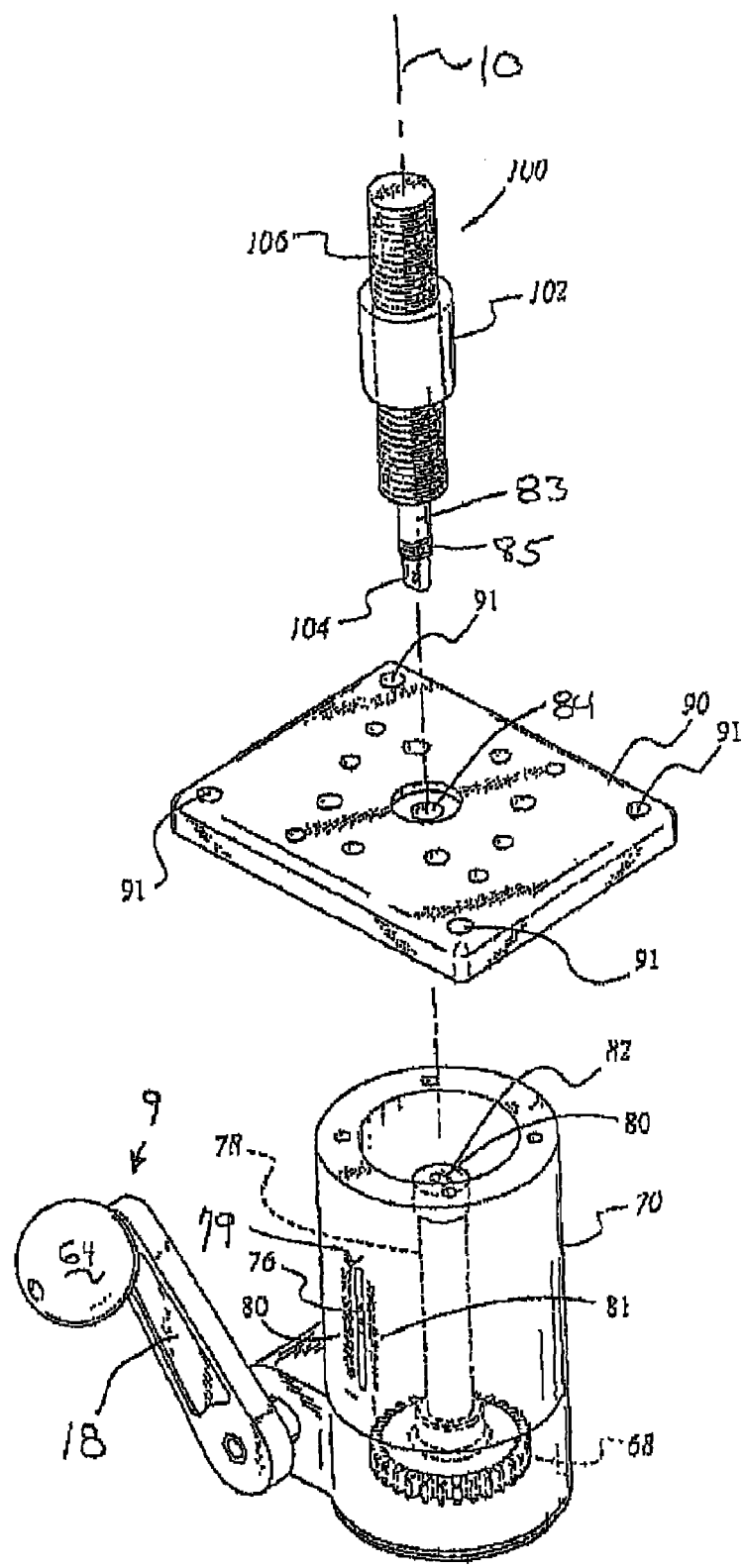
FIG. 4 is a perspective view showing the components illustrated in FIG. 3 assembled and shown together with a partially exploded representation of the ball screw and support plate of the preferred embodiment of FIG. 2.

Referring further now to FIG. 4, additional details of the first preferred embodiment of outrigger apparatus 20 will now be described. The underbody 70 is mounted to the lower surface of a flat base plate 90. The base plate 90 is provided with holes 91 which may receive bolts or other suitable fasteners (not shown) for mounting the outrigger apparatus 20 to vessel 30. The center of the base plate 90 has a circular opening 84 centered axially on axis 10 aligned with the head 82 of shaft 78. A ball screw assembly 100 is provided which includes a threaded ball screw 106, and a ball nut 102 that is threadably coupled to the ball screw 106 such that when relative rotation of ball screw 106 and ball nut 102 occurs, relative linear motion between ball screw 106 and ball nut 102 also occurs. A plurality of ball bearings (not shown) mounted in bearing cage is preferably interposed between ball nut 102 and ball screw 106. The lower end of the ball screw 106 has a reduced diameter threaded section 85 from which a flattened, unthreaded drive tab 104 extends. The reduced diameter threaded lower section 85 of ball screw 106 is passed through the opening 85 and receives a flat washer followed by a threaded nut (not shown in FIG. 4) which attaches ball screw 106 to support plate 90 in a manner which allows ball screw 106 to rotate about axis 10 relative to support plate 90. Preferably, one or more bearings (not shown in FIG. 4) are interposed between ball screw 106 and support plate 90 on the upper side of support plate 90 to facilitate such rotation. A similar bearing may also be installed on the underside of support plate 90 and retained by the nut affixed to the reduced diameter threaded section 85 of ball screw 106. The drive tab 104 extends through the central circular opening 84 of the base plate 90 and drivingly engages the complementary shaped slot 80 in the head 82 of the vertical shaft 78 so that rotation of the vertical shaft 78 in either rotational direction is transmitted to the ball screw 106 to effect reversible relative rotation between ball nut 102 and ball screw 106 which in turn produces reversible relative linear motion of ball screw 106 and ball nut 102 in a direction parallel to axis 10.

Figure 5:
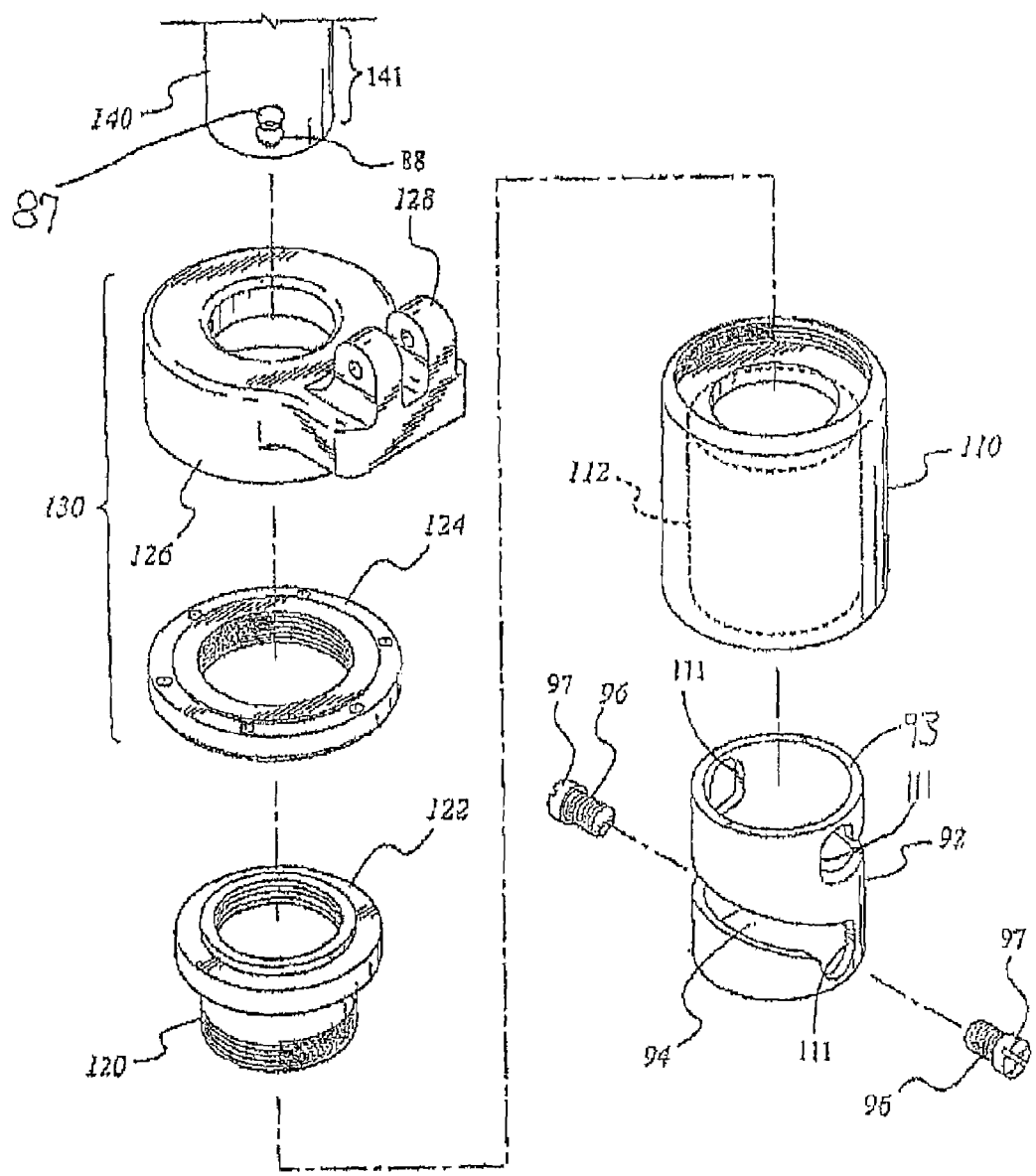
FIG. 5 is an exploded perspective view of an upper portion of the preferred embodiment of FIG. 2.
Figure 6:
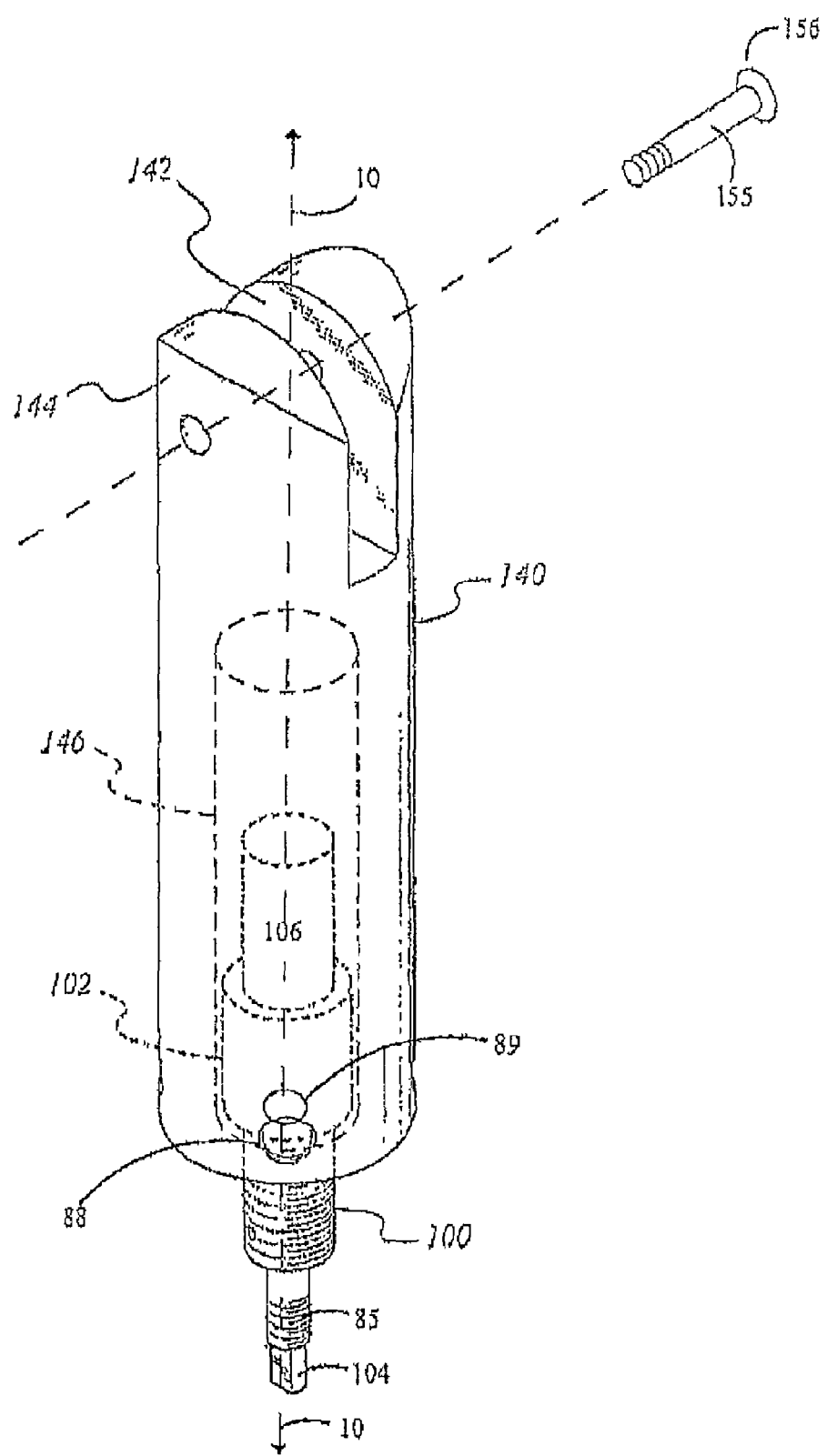
FIG. 6 is a perspective view of the piston and ball screw assembly of the preferred embodiment of FIG. 2.
Figure 7:
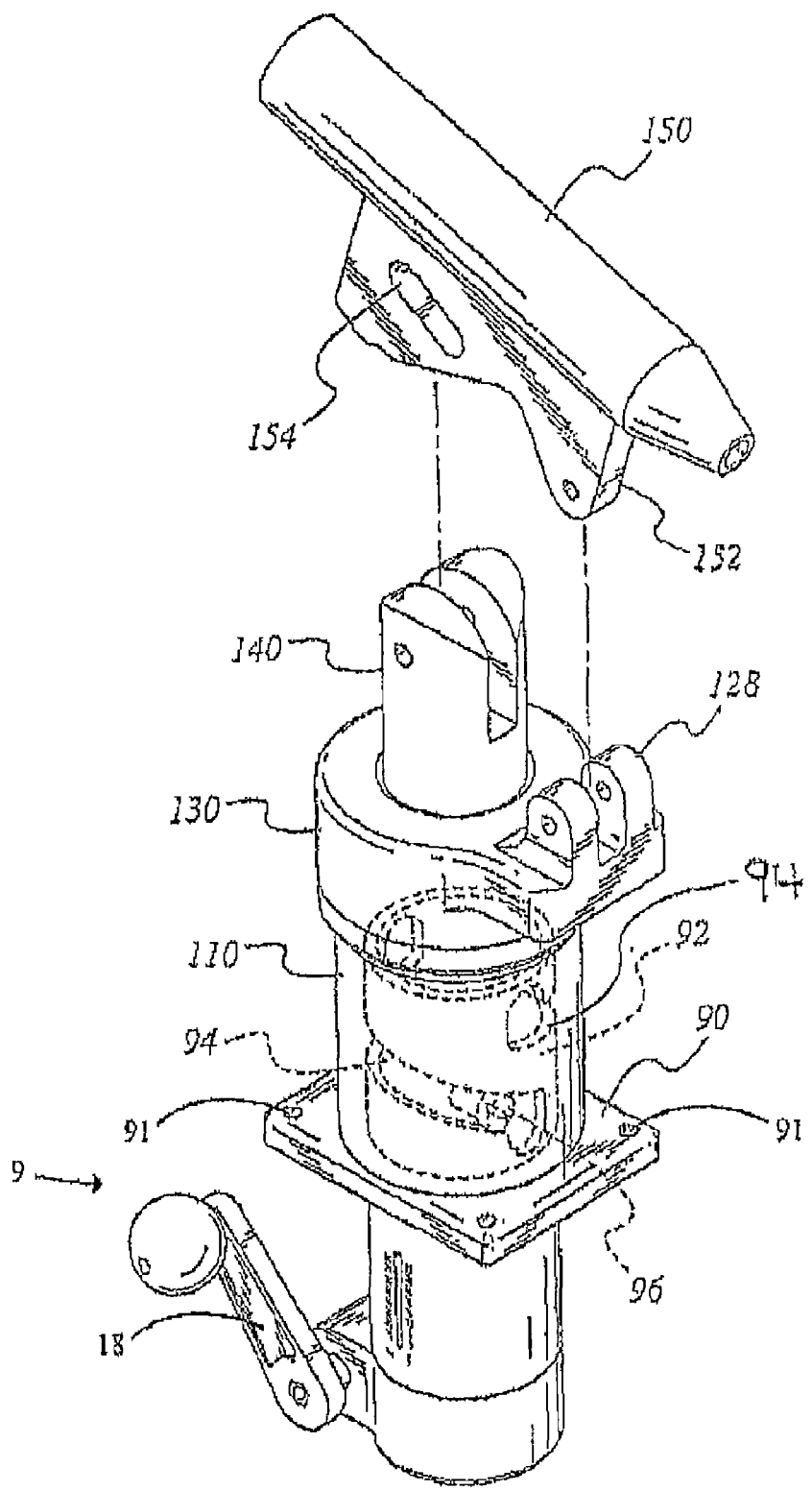
FIG. 7 is a perspective, partially exploded view of the preferred embodiment of FIG. 2.

Referring now to FIGS. 5, 6, and 7, further details of the first preferred embodiment of adjustable fishing outrigger apparatus 20 will now be described. The outrigger apparatus 20 further comprises an upper body 110 which is attached to the upper surface of the base plate 90 by a plurality of cap screws (not shown). The upper body 110 is a hollow cylinder. The lower portion of the interior of the upper body 110 defines a cylindrical cavity 112 inside of which is received a bayonet coupling 92. The bayonet coupling 92 has a right circular cylindrical wall 93 the lower end of which is fastened to base plate 90 using a plurality of threaded set screws (not shown). The wall 93 of coupling 92 has formed therein at least one spiral or helical track 94 which is pitched in a direction along axis 10. Preferably, the wall 93 of coupling 92 is provided with more than one track 94 in order to provide additional support and resistance to wear by distributing the mechanical load carried by track 94 over a larger total surface area. If more than one track 94 is used, all should be of the same pitch and can be identical in all respects to one another. The pitch of track 94 will determine the correlation between the horizontal motion and the vertical motion of the piston 140 and thus will also determine the relative relationship between the instantaneous elevation angle 14 of the longitudinal centerline 44 of outrigger pole 40 and its rotation angle 11.

The lower end 141 of piston 140 slidably engages the bayonet coupling 92. A pair of guide pins 96 thread into mating holes 87 and 88 located at the lower portion 141 of the piston 140 on opposite sides of the coupling 92. At the upper and lower ends of each track 94 are vertical detents. The unthreaded cylindrical circumferential surfaces 97 of the heads of each guide pin 96 serves as bearing surfaces which engage each respective track 94. The heads of each guide pin 96 slidably engage one of the tracks 94 so that sliding the piston 140 vertically within the coupling 92 causes the guide pins 96 to move up or down the incline of the tracks 94, rotating the piston within the coupling 92. To limit play in the direction along axis 10, the diameter of the head of each guide pin 96 is only slightly less than the width of the slots which define each track 94. When the guide pins 96 are at the upper or lowermost ends of the tracks 94, the guide pins 96 engage the corresponding vertical detents. Engaging the decent 111 helps lock the rotatable mechanism in place so that external forces applied to an outrigger pole 140 held by the outrigger apparatus 20 do not displace the outrigger pole 40 from the fully deployed position or from the stowed position. Engaging the guide pins 96 in the detents 111 also helps prevent external forces from being transmitted into the gear train, which would cause wear on the drive mechanism components of the outrigger.

In a typical installation, a pair of outriggers 20 are mounted on opposite sides of a fishing vessel. The outrigger apparatus 20 on the port side of the vessel 30 is constructed to elevate as the outrigger pole 40 is rotated in a counterclockwise direction, while the outrigger apparatus 20 on the starboard side of the vessel 30 would be constructed to elevate as the outrigger pole 40 is rotated in a clockwise direction. These opposing travel senses are achieved by having the tracks 94 of the outrigger apparatus 20 installed on the port side pitched in a counterclockwise direction along axis 10, while the tracks 94 of the coupler 92 of the starboard side outrigger apparatus 20 would be pitched in a clockwise direction along axis 10.

The ball nut 102 is affixed to piston 140 within a cavity 146 within the piston 140. A lower portion of the piston cavity 146 houses the ball nut 102. As the ball screw 106 is rotated by the drive shaft 78 under motive power delivered by the rotatable driving device 9, the ball nut 102 moves linearly within piston cavity 146 carrying piston 140 in an axial direction along axis 10 relative to the ball screw 106 of the ball screw assembly 100. Since piston 140 is attached to ball nut 102, this results in a corresponding linear motion of the piston 140 along axis 10 within the upper body 110 of the outrigger apparatus 20.

A cap seat coupling 120 provides a reduced friction surface for the upper rotating components of the manually adjustable outrigger apparatus 20. The lower portion of the cap seat coupling 120 threads into the top of the upper body 110 via threads 121. The upper portion of the cap seat coupling 120 is provided with a smooth annular ring 123. The annular ring 123 provides a seat 122 for the cap assembly 130 described below, allowing the cap assembly 130 to rotate freely about axis 10.

The cap assembly 130 comprises a cap base 124, and the cap head 126. The cap base 124 is a hollow cylinder. The lower surface of the cap base 124 provides a smooth surface, which seats against the cap seat 122 allowing the cap assembly 130 to rotate around the piston 140. The cap head 126 is also a hollow cylinder concentric with the piston 140 and centered on axis 10. The lower rim of the cap head 126 is attached to the upper rim of the cap base 124. The upper surface of the cap head 126 is provided with lugs 128 for pivotally attaching a linkage 152 so that the linkage 152 can pivot in a vertical plane.

At the end of the linkage 152 opposite that pivotally attached to the cap head 126, the linkage 152 is pivotally attached to the piston 140 at a slot 154 defined in the linkage. A vertical slot 142 bifurcates the upper portion of the piston 140 forming a clevis 144. A pin 155 extending through the clevis 144 slidably and pivotally engages the linkage slot 154. Pin 155 may suitably take the form of an unthreaded portion of the shank of a cap screw 156. A cylindrical plastic bushing (not shown) is preferably captured in slot 154 mounted on pin 155. When the piston 140 moves linearly in either opposed direction along axis 10, the linkage 152 pivots at the cap head 126 and piston pivot points, varying the elevation angle 14 of the linkage 152. A receiver 150 is preferably attached to the top of the linkage 152 so that the elevation angle 14 of the longitudinal centerline of outrigger pole 40 mounted in the receiver 150 is the same as that of the linkage. The receiver 150 is a hollow cylinder, tapered at one end to allow the receiver 150 to grip an outrigger pole 40.

Summarizing the operation of the drive mechanism of the preferred embodiment, when the shaft 60 is rotated, the engagement of worm 56 with gear 68 translates the rotation of shaft 60 into rotation of ball screw 78 of a ball screw assembly 100. The ball screw assembly 100 includes a ball nut 102 and moves the piston 140 either up or down along axis 10 depending on the direction of rotation of the ball. The track 94 to which piston 140 is coupled forces the piston 140 to rotate as the piston 140 moves linearly along axis 10. The linear axial motion of piston 140 along axis 10 and the axial rotation of the piston 140 about axis 10 is transmitted to a receiver holding an outrigger pole 140 to substantially infinitely variably position the outrigger pole at a stowed position, a deployed position or at virtually a position along a defined path therebetween. An indicator 72 moves axially along the ball screw 106 and is visible via a slot present in upper body 70 to indicate the instantaneous position of the outrigger pole 140.

The horizontal position of a trolling pole may be between 10° and 80°, as measured from the stern. The elevation angle 14 of the outrigger pole 40 preferably ranges from about four degrees (4°) above horizontal when outrigger pole 40 is in a stowed position to about thirty-two (32°) above horizontal in the fully deployed position. Correspondingly, the rotational angle 11 may preferably range from and between, about zero degrees (0°) when to about ninety degrees (90°) or more when outrigger pole 40 is in a fully deployed position, each as measured, for example, relative to a reference such as a line which runs parallel to the longitudinal centerline 44 of a vessel 30. These angular descriptions are provided by way of example and do not limit the invention to the particular angles and/or ranges just described.

The gear drive mechanism of the first preferred embodiment described above with reference to FIGS. 2 through 7 converts the rotation of rotatable driving device 9 such as a hand crank 18, or alternatively, an electric motor 19, to a rotatable drive mechanism into reversible rotation of a rotatable element of ball screw assembly 100, in this case, ball screw 106, by way of a shaft 78 by way of an interposed gear mechanism includes worm 56 and gear 68. The gear drive mechanism of the first preferred embodiment as described above includes the worm 56 which engages the gear 68 coupled to a vertical shaft 78. The worm 56 and worm gear 68 combination convert the rotation of the rotatable driving device 9 to rotation of a ball screw 106 about a vertical axis 10. Such gear drive mechanism may alternatively be comprised of any alternative and/or additional arrangement for transferring motive power from a rotatable driving device, including, but not limited to, arrangements of planetary gears, ring and pinion gears, and/or helical gears.

In the second preferred embodiment 20' of FIGS. 8A and 8B, a well as in the third preferred embodiment 20" of FIG. 11 which will be described further below, the use of gears has completely eliminated thus providing a fishing outrigger apparatus which not only has fewer components and thus can be produced at lower cost, made smaller and lighter in weight, assembled more quickly and easily and operate more reliably than even the first preferred embodiment 20 described above.

As in the case of the first preferred embodiment 20 described above, as well as in the third preferred embodiment 20" which will be described further below, the second preferred embodiment of an outrigger apparatus 20' includes a rotatable-driving device 9, which may suitably take the form of a manually powered crank 18 or an electric motor 19. If a manual crank 18 is selected, it preferably includes a crank arm 62 having a knob 64 as described above, and is connected such that its output shaft 13 rotates about axis 10 and is drivably coupled to the axially rotatable member of ball screw assembly 100 without interposed gearing. If the rotatable driving device 9 is instead selected to be an electric motor 19, the output shaft 13' of the motor is also preferably drivably coupled to the axially rotatable member of ball screw assembly 100 without interposed gearing.

Figure 8A:
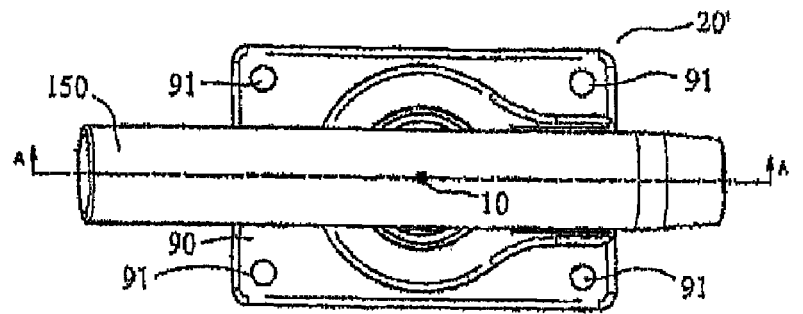
FIG. 8A is a plan view of a second preferred embodiment of an outrigger apparatus according to the present invention.
Figure 8B:
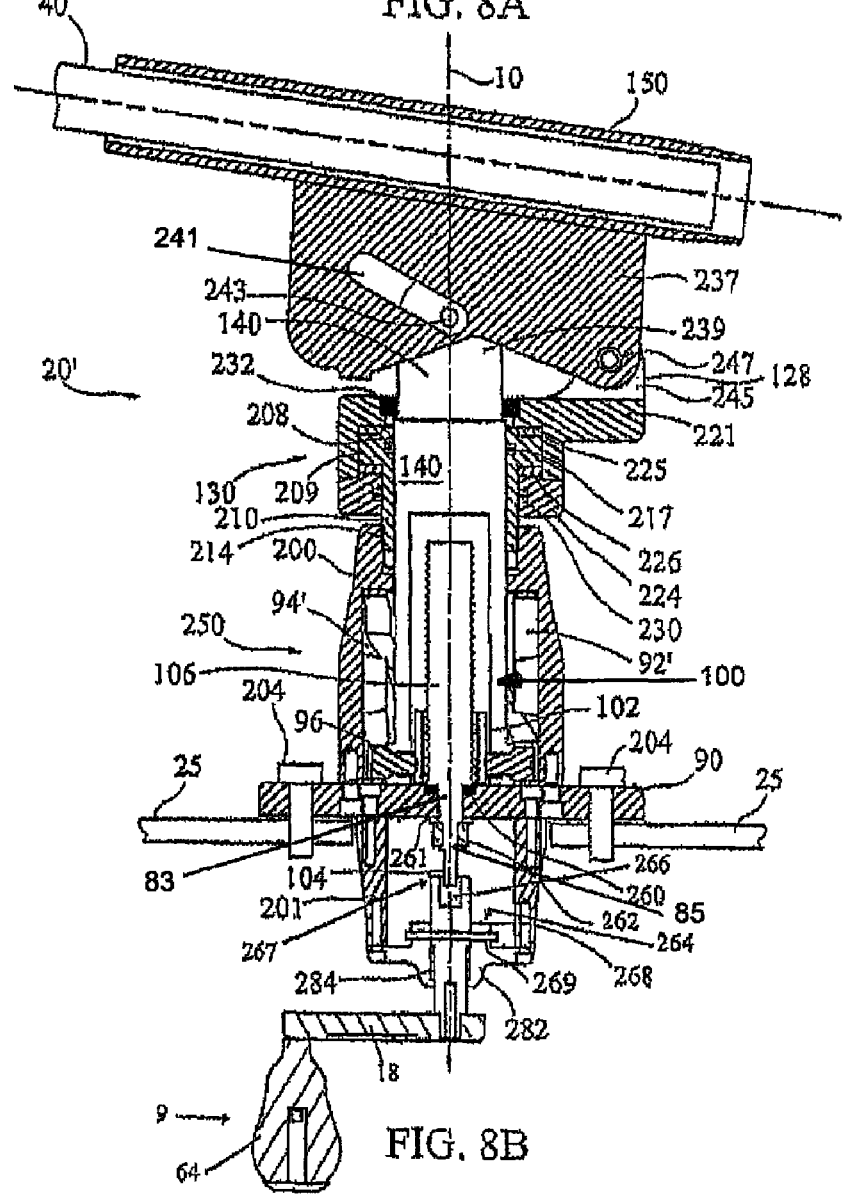
FIG. 8B is a longitudinal cross-sectional view of the embodiment of FIG. 8A.

A second preferred embodiment of an adjustable fishing outrigger apparatus 20' according to the present invention is illustrated in the top plan view in FIG. 8A and in the corresponding longitudinal cross sectional view of FIG. 8B. Apparatus 20' includes an upper housing 200 and a lower housing 201 which are secured to opposite sides of a base plate 90 by way of a plurality of recessed cap screws (not shown). Base plate 90 includes a plurality of mounting holes 91 for a mounting apparatus 20 to a mounting location on a marine vessel 30 such as for example, an overhead structure 25 or to any other suitable structure associated with the vessel 30 using any suitable fasteners 204 such as bolts secured with lock nuts having nylon inserts and backed by flat washers (not shown).

Apparatus 20' includes a piston 140 an upper portion of which extends from a cap assembly 130. Cap assembly 130 includes a cap 221 and a flange body which are non-rotatably joined to one another using recessed cap screws (not shown). Cap assembly 130 also includes a connector nut 208, about which cap 221 and flange body 224 are free to rotate together as a unit. Cap assembly 130 is coupled to the top of upper housing 200 by way of connector nut 208, which includes a radially outwardly projecting ring-shaped collar 209 and a cylindrical flange 210 the latter of which projects downwardly from the underside of collar 209. The lower end of flange 210 carries external male threads which are threaded securely into a threaded cylindrical recess 214 formed in the top of housing 200. Connector nut 208 is installed sufficiently securely in recess 214 so as not to be capable of rotating relative upper housing 200 when apparatus 20' is in use. Collar assembly 130 includes a cylindrical passage which is centered on axis 10 and through which passes a portion of piston 140. A seal 217 is provided between the outer surface of piston 140 and the inside of collar 207 to resist infiltration of contaminating fluids or particulates.

Collar 209 is captured between cap 221 and a flange body 224 in a manner which permits the cap 221 and flange body 224 to rotate relative to connector nut 208, upper housing 200, lower housing 201, and base plate 90, in response to rotation of piston 140. To allow such relative rotation to take place smoothly and with minimal friction, a suitably lubricated bearing 225 is preferably interposed between cap 221 and the upper surface of the ring-shaped collar 209 of connector nut 208. For the same reasons, a bearing 226 is also preferably provided between the lower surface of the ring-shaped collar 209 of connector nut 208 and flange body 224. Bearings 225 and/or 226 may suitably take the form of either sealed or unsealed roller bearings, ball bearings or needle bearings, rings of a synthetic material having high lubricity such as the materials such as those available under the tradename Delrin® and Teflon®. As further assurance that operation of apparatus 20' will not be impaired, or corrosion induced, by ingress of water or other contaminating liquids or particulates, a second seal 230 is preferably interposed between the outside of the unthreaded portion of flange 210 and flange body 224 and a resilient ring seal 232 is preferably interposed between the exterior surface of piston 140 and cap 221, all as shown in FIG. 8B.

Receiver 150 is welded to a plate 237 which is received in a vertical slot in the bifurcated upper end 239 of piston 140. Plate 237 includes an angled slot 241 which is traversed by an unthreaded shank portion of the cap screw 243 which is centered on axis 10 thereby rotationally coupling piston 140 to plate 237, receiver 150 and thus, outrigger pole 40 with respect to rotation about axis 10. For smoother and quieter operation, the unthreaded shank of cap screw 243 may optionally be encased in a plastic bushing (not shown).

Cap 221 carries a clevis 245 having a pair of mutually spaced lugs 128. Clevis 245 is pivotally coupled to plate 237 by way of the unthreaded shank portion of a cap screw 247. Cap screw 247 is mounted centered on a pivot axis at a pivot location which lies laterally offset from axis 10. Owing to the connections made by way of cap screws 243 and 247 as just noted, it will be appreciated that rotation of piston 140 about axis 10 in either rotational direction will drive plate 237, receiver 150, and outrigger pole 140 as well as cap 221 and flange 224 all to rotate correspondingly about axis 10 since all are rotationally coupled to one another with respect to such rotation. In contrast, housings 200 and 201 and base plate 90 do not rotate about axis 10 but instead, all remain fixed relative to one another and to marine vessel 30. Piston 140 is drivable to not only to be capable of rotating reversibly either direction around axis 10, but also to move linearly along axis 10 in either direction in a manner which is not only concurrent with such rotation about axis 10 but is mutually coordinated therewith. Further details of the structure of the second preferred embodiment 20' will now be described in further detail with continued reference to FIGS. 8A and 8B.

Apparatus 20' includes a rotatable drive mechanism 250 which is preferably housed completely inside the upper housing 201 above base plate 90 as illustrated in FIG. 8B and which can be, and preferably is, completely gearless. As shown in FIG. 8B, an improved adjustable fishing outrigger apparatus 20' includes a bayonet coupler 92' in the general form of a hollow right circular cylinder having a wall 93 within which is formed at least one spiral or helical track 94' pitched along axis 10. Preferably a plurality of tracks 94' are provided in order to distribute forces over an increased surface area. Most preferably four (4 ea.) tracks 94' of mutually identical size, shape and pitch are formed as slots in bayonet coupler 92'.

Ball screw assembly 100 is disposed inside a cylindrical cavity 146 formed in piston 140 and includes a ball screw 106 coupled to a ball nut 102 as described above. Ball nut 102 is secured in positionally fixed relation to piston 140 so as to be incapable of either relative linear movement or relative rotation with respect to piston 140. Piston 140 is slidably coupled to the spiral or helical tracks 94' of a coupler 92' via guide pins 96. Coupler 92' is secured against rotation relative to base plate 90 by a plurality of recessed threaded set screws, not shown. Coupler 92' is captured within the interior of housing 200 in such a way that coupler 92' is also prevented from being free to move radially or axially inside housing 200. Ball screw 106 includes or is drivably coupled to, a cylindrical shaft 83 which is axially centered on axis 10 and whose outer surface is smooth except for a threaded section 85 which terminates in a flattened, unthreaded drive tab 104. Ball screw 106 is rotatably mounted to base plate 90 by way of a first suitably lubricated bearing 260 disposed between ball screw 106 and the upper side of plate 90. A second bearing 261 is preferably disposed between the lower surface of plate 90 and a nut 262. Nut 262 is threadably secured to the threaded portion 85 to mount ball screw 102 on support plate 90 in a manner which is secure but allows ball screw 106 to rotate relative to support plate 90 and housing 200. As a safety measure, nut 262 is preferably locked to the threaded portion 85 of shaft 83 in a suitable conventional way such as by applying a permanent or semi-permanent fluid thread locking compound, such as that generally commercially available under the brand Loctite®, which is a registered trademark of Henkel Corporation of Rocky Hill, Conn. and/or by applying a second nut (not shown) to threaded portion 85 and torquing same into abutment with nut 262 to serve as a lock nut, and/or by installing a set screw (not shown) in a radial threaded hole (not shown) through the side of nut 262 such that the set screw engages threaded portion 85 to prevent unintentional loosening of nut 262.

If an electric motor 19 is selected as the rotatable driving device 9, the motor 19 is preferably a direct current (D.C.) motor which coupled to a source 12 of D.C. electrical energy available on vessel 30 by way of a switch 17 of a type suitable for selectively energizing motor 17 in a rotationally reversible manner. If an electric motor 19 is used as rotatable driving device 19, lower housing 201 may be enlarged as may be required to house motor 19 interiorly of housing 201. Alternatively, rotatable driving device 9 may suitably comprise a manual crank 18. In either case, the output shaft 13 of the rotatable driving device 9 is supported for rotation centered about axis 10.

Figure 11:
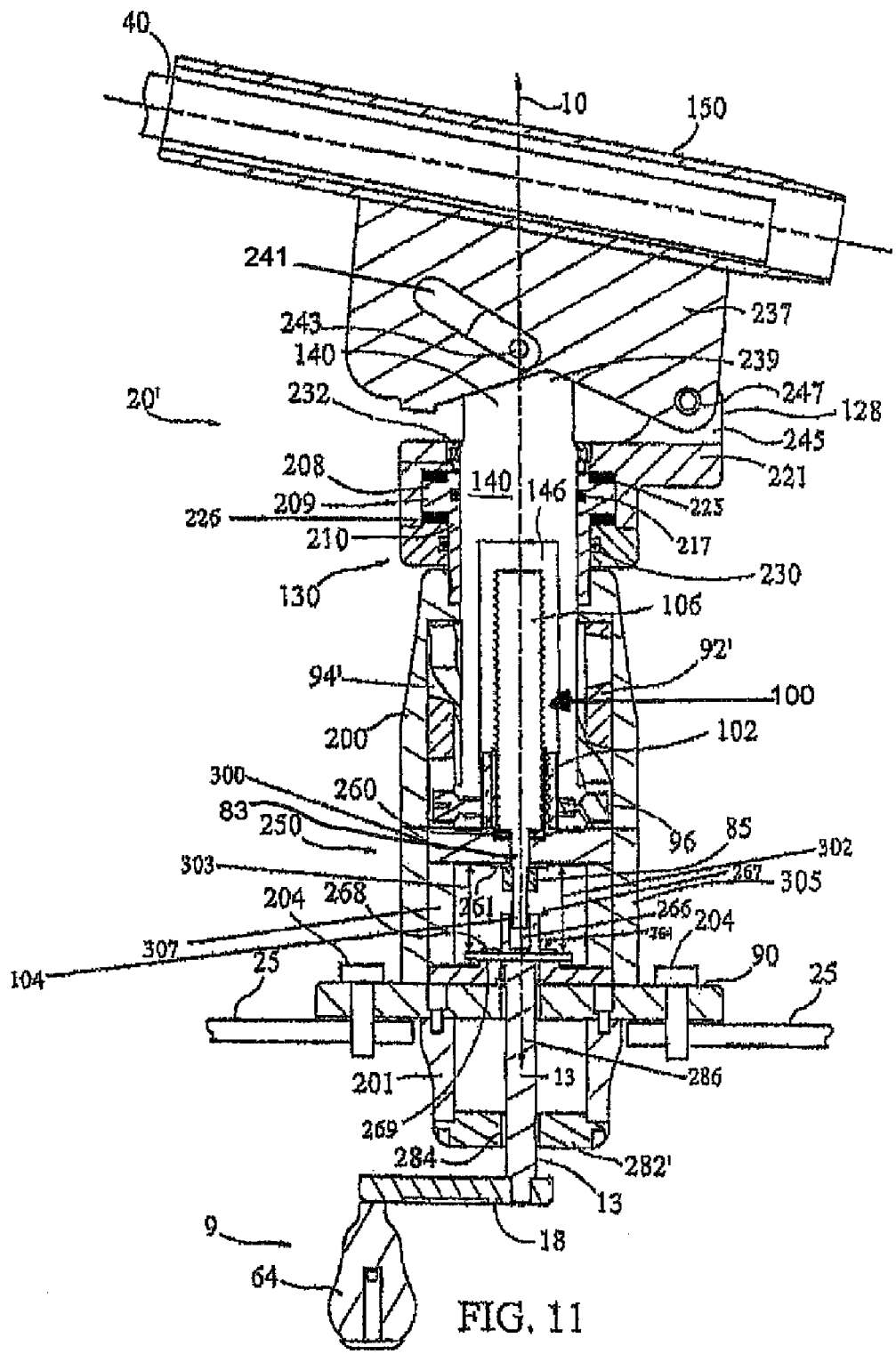
FIG. 11 is a longitudinal cross-sectional view of a third preferred embodiment of an outrigger apparatus according to the present invention.

In the second preferred embodiment of FIGS. 8A and 8B as well as in the third preferred embodiment of FIG. 11, a latch mechanism 264 is interposed between the rotatable driving device 9 and the ball screw assembly 100. The latch mechanism 264 includes at least two mutually engageable members 268, 269 which preferably include complementary-shaped mating surfaces. One of the latch members may suitably comprise for example, a solid cylindrical pin 269 which extends generally transversely of axis 10. Pin 269 passes through the output shaft 13 of the rotatable driving device and projects radially outwardly some distance on both side thereof.

Figure 9A:
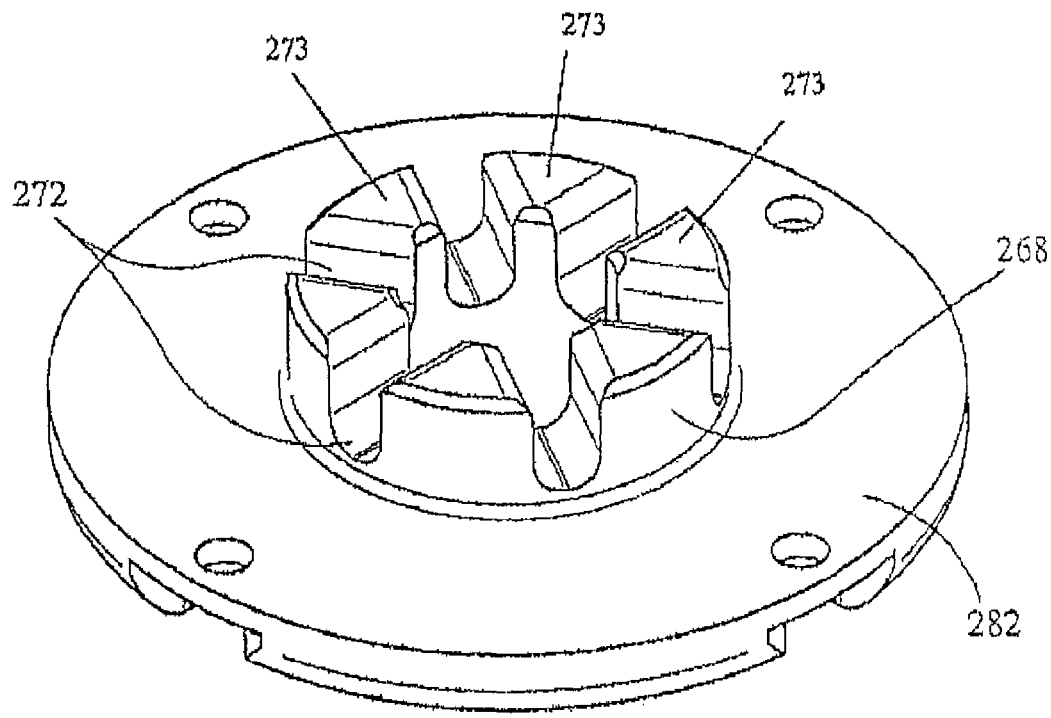
FIG. 9A is a perspective view of the upper side of a cap shown in FIG. 9 which carries a latch member.
Figure 9B:
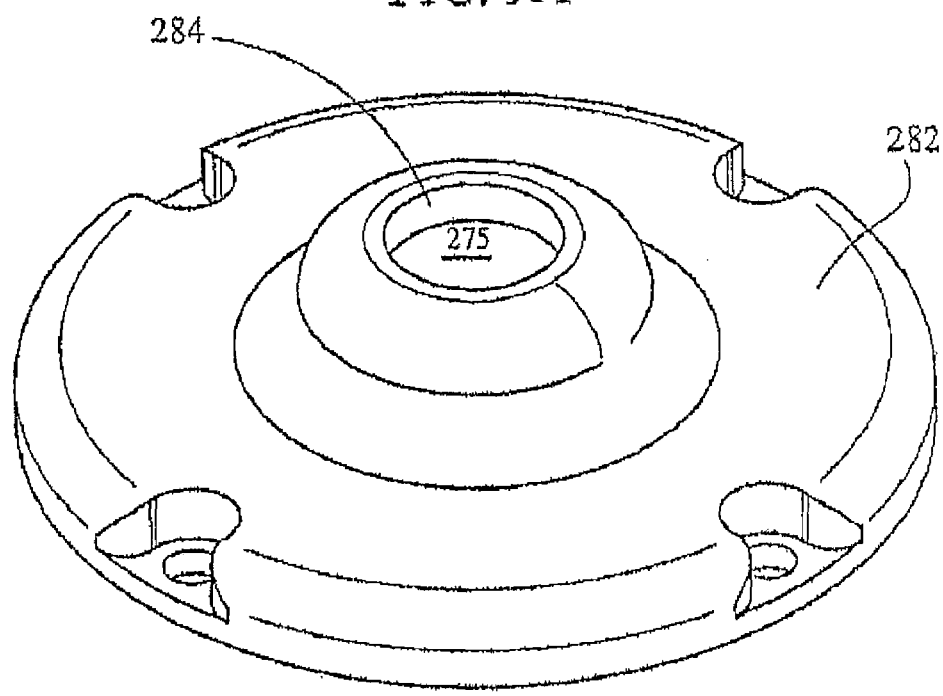
FIG. 9B is a perspective view of the lower side of the cap shown in FIGS. 9 and 9A.
Figure 10:
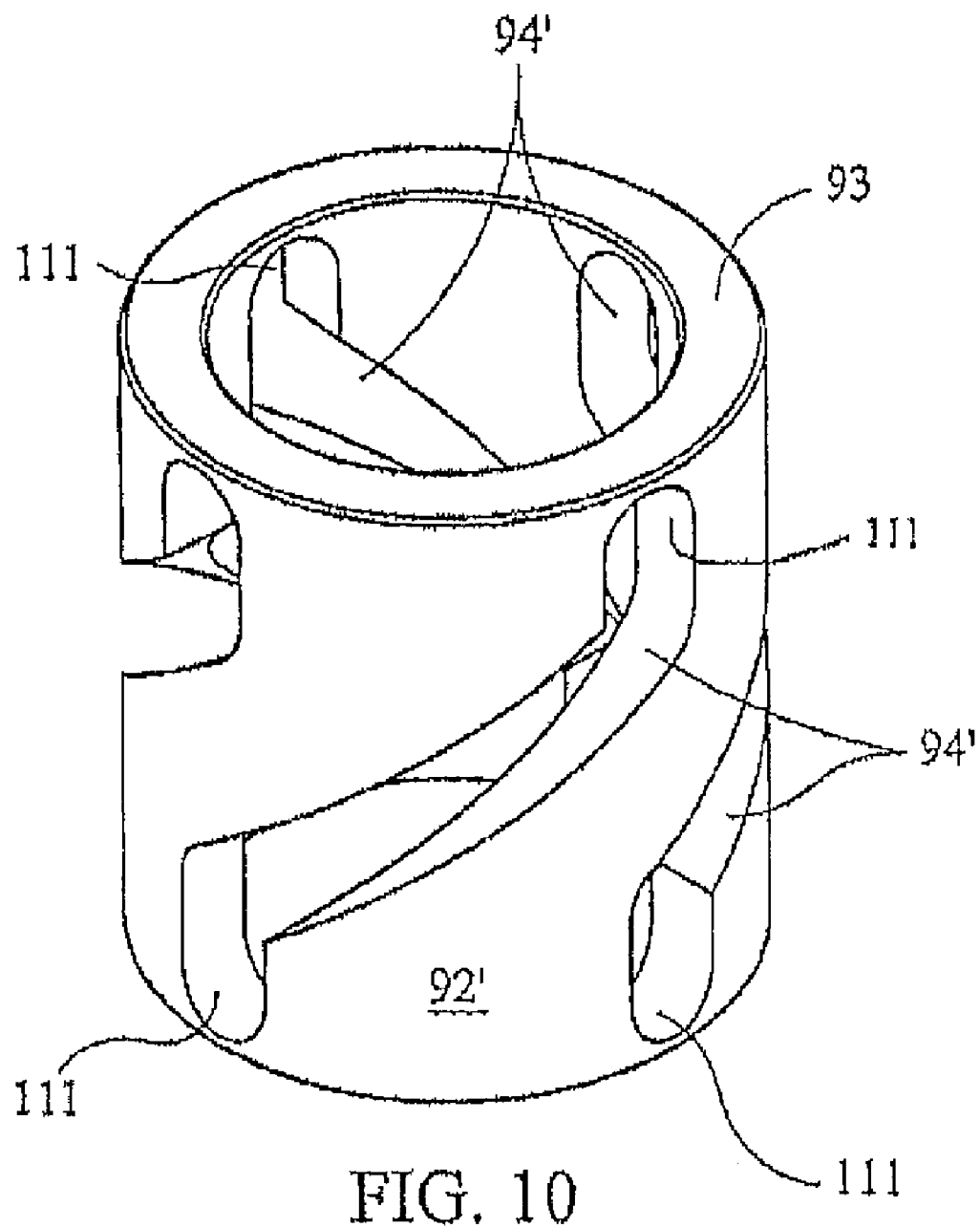
FIG. 10 is a perspective view of a coupler used in the second and third preferred embodiments.

Referring additionally now to FIGS. 9A and 9B it can be seen that the second mutually engageable member of latch mechanism 264 may suitably take the form of a boss 268 which includes at least one, and preferably a plurality of recesses 272 of suitable shape and dimension to receive the radially projecting portions of pin 269 when pin 269 is suitably angularly aligned therewith. Preferably, between recesses 272, boss 268 includes one or more projections 273 which have surfaces which slope toward at least one adjoining recess 272 to guide pin 269 smoothly into engagement with a recess 272. Boss 268, including its one or more projections 273, is preferably axially centered on axis 10 and has a central opening 275 through which the output shaft 13 passes. Boss 268 can be mounted to, or be formed integrally with, a plate 282 which can be secured to cap the lower end of housing 201. To mount the shaft 13 for smooth rotation as well as smooth axial translation, at least a portion of the peripheral wall of opening 275 may be fitted with a suitable bushing 284 which may be formed of a tough low-friction material such as brass or Delrin®.

The upper end of shaft 13 includes a recess 266 which, together with the drive tab 104, forms a slip coupling 267 at least a portion of tab 104 preferably remains at least partially received at all inside recess 266 and is shaped such that rotation of shaft 13 will rotatably drive the rotatable element of ball screw assembly 100, that element in the depicted embodiments being ball screw 106. However, shaft 104 terminates sufficiently short of the bottom of recess 266 such that pushing shaft 13 in an upward direction along axis 10 will cause latch mechanism 264 to disengage by forcing pin 269 out of recesses 272 a sufficient distance in an axial direction to allow pin 269 to be rotatably clear of the axial projections 273 of boss 268 and thus allow shaft 13 to rotate about axis 10. Pin 269 must be maintained rotatably clear of boss 268 while shaft 13 is being rotatably driven. Otherwise, engagement of pin 269 will cause apparatus 20', 20" to resist rotation, and thus, be effectively rotationally locked irrespective of whether the guide pins 96 happen to be located in any of the vertical detents 111 of the track 94' in coupling 92'.

When engaged, locking action of latch mechanism 264 resists rotation which might otherwise occur as the result of torque applied from either side of latch mechanism 264, including not only torque which might be applied intentionally via by the rotatable driving device but also torque transmitted back through apparatus 20', 20". As a result of the weight of outrigger pole 140, and/or as a result of wind drag, impact of outrigger pole 40 with waves or objects, and on inertial forces due for example to buffeting of vessel 30 by waves.

It is to be appreciated that latch mechanism 264 is gravity biased forcibly in favor of mutual engagement of pin 269 in recesses 267 owing to the fact that the mutually engageable latch members 268, 269 engage and disengage by travel in a direction under at least a substantial vector component results from the weight of at least one of latch members 268, 269 and/or other components of apparatus 20', 20" which are coupled thereto. In the embodiments of FIGS. 9 and 11 for example, the combined weight of shaft 13, pin 269 and rotatable driving device 9 all act in the direction of axis 10 and generate sufficient bias forces 286 to maintain pin 269 and boss 268 in rotatably locked engagement unless such force is counteracted by deliberate action of a user of apparatus 20', 20". If desired, a spring can be provided to increase the magnitude of bias force 286. In order to do so, pin 269 can be lengthened to project a sufficient radial distance beyond the perimeter of boss 268 to support one end of a coil spring situated and acting as schematically represented by arrows 302 and 303 in FIG. 11.

It is to be appreciated that in manually operated embodiments this is particularly advantageous because only one had is needed to operate the latch and rotatable drive mechanism.

In addition to allowing on-handed operation, the latch operates automatically in a fail-safe manner since there is no need to remember or to perform a separate operation.

A third preferred embodiment of outrigger apparatus 20" as illustrated in FIG. 11 is structurally and operationally like that of the second preferred embodiment 20' of FIGS. 8A and 8B except that a housing extension 305 is interposed between base plate 90 and upper housing 200 and an intermediate plate 300 supported by a spacer 307 provided in order to position the latch mechanism 264 above base plate 90 rather than inside lower housing 201.

It is to be understood that the present invention is not limited to the embodiments described above, but encompasses any and all embodiments within the scope of the following claims.

While the invention has been described with reference to the preferred embodiments, it should be understood by those skilled in the art that various changes may be made and equivalents substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An adjustable fishing outrigger apparatus for use on a marine vessel for positioning an outrigger pole, said apparatus comprising:
   a receiver adapted for holding the outrigger pole, said receiver being mounted to allow relative movement between said vessel and said receiver with respect to both (i) an angle of rotation of the outrigger pole about an axis, and (ii) an angle of the outrigger pole to a plane which is perpendicular to said axis;
   a rotatable driving device;
   a ball screw mechanism including a ball screw and a ball nut, one of said ball screw and said ball nut being mechanically coupled to said rotatable driving device to effect (i) relative rotation of said ball screw with respect to said ball nut in response to rotation of said driving device, and to effect (ii) relative linear movement of said ball screw with respect to said ball nut;
   a helical track pitched in a direction along said axis; and
   a member coupled to said ball screw mechanism and to said helical track to simultaneously effect, in response to said relative linear movement of said ball screw with respect to said ball nut, both linear movement of said member in a direction parallel to said axis and rotation of said member about said axis, said member further being coupled to said receiver for driving said receiver to simultaneously effect both (i) adjustment of said angle of the outrigger pole relative to said plane and (ii) adjustment of said angle of rotation of the outrigger pole relative to said axis.

2. The apparatus of claim 1 wherein said driving device is a manually powered driving device.

3. The apparatus of 2 wherein said driving device comprises a rotatably reversible driving device.

4. The apparatus of claim 1 wherein said rotatable driving device further comprises an electric motor.

5. The apparatus of claim 1 further comprising a slip coupling interposed between said rotatable driving device and said ball screw mechanism.

6. The apparatus of claim 1 further comprising a latch mechanism interposed disposed between said rotatable driving device and said ball screw mechanism.

7. The apparatus of claim 1, further comprising: a latch mechanism interposed between said rotatable driving device and said ball screw mechanism, said latch mechanism comprising a pair of matable latch members which are mounted for selective bidirectional relative linear movement toward and away from one another in opposing first and second directions parallel to said axis, said pair of members being selectively engageable with one another upon being moved toward one another in said first direction to resist mutual relative rotation about said axis, said pair of members being selectively disengageable upon being moved away from one another in said second direction to allow said mutual relative rotation about said axis.

8. The apparatus of claim 7 further comprising a slip coupling coupled to at least one of said latch members to allow said relative movement of said latch members toward and away from one another.

9. The apparatus of claim 8 wherein said slip coupling is biased in favor of said engagement of said pair of members under a force acting along said axis, said force having a magnitude of which at least a portion results from gravity acting upon said slip coupling.

10. An adjustable fishing outrigger apparatus for use on a marine vessel for positioning an outrigger pole, said apparatus comprising:
- a receiver adapted for holding the outrigger pole, said receiver being mounted to allow relative movement between said vessel and said receiver with respect to both (i) an angle of rotation of the outrigger pole about an axis, and (ii) an angle of the outrigger pole to a plane which is perpendicular to said axis;
- a rotatable driving device;
- a ball screw mechanism including a ball screw and a ball nut, one of said ball screw and said ball nut being mechanically coupled to said rotatable driving device to effect (i) relative rotation of said ball screw with respect to said ball nut in response to rotation of said driving device, and to effect (ii) relative linear movement of said ball screw with respect to said ball nut;
- a track pitched in a direction along said axis;
- a member coupled to said ball screw mechanism for effecting linear movement of said member responsive to said relative rotation of said ball screw with respect to said ball nut, said member also being coupled to said track, said member being linearly movable in a direction parallel to said axis in response to said relative linear movement of said ball screw with respect to said ball nut, said member further being coupled to said receiver for driving said receiver to effect both (i) adjustment of said angle of the outrigger pole relative to said plane and (ii) adjustment of said angle of rotation of the outrigger pole relative to said axis; and
- a latch mechanism interposed between said rotatable driving device and said ball screw mechanism, said latch mechanism comprising a pair of matable latch members which are mounted for selective bidirectional relative linear movement toward and away from one another in opposing first and second directions parallel to said axis, said pair of members being selectively engageable with one another upon being moved toward one another in said first direction to resist mutual relative rotation about said axis, said pair of members being selectively disengageable upon being moved away from one another in said second direction to allow said mutual relative rotation about said axis.

11. The apparatus of claim 10 further comprising a slip coupling coupled to at least one of said latch members to allow said relative movement of said latch members toward and away from one another.

12. The apparatus of claim 11 wherein said slip coupling is biased in favor of said engagement of said pair of members under a force acting along said axis, said force having a magnitude of which at least a portion results from gravity acting upon said slip coupling.

* * * * *